(12) United States Patent
Sugimoto et al.

(10) Patent No.: US 12,218,356 B2
(45) Date of Patent: Feb. 4, 2025

(54) COMPOSITION FOR NON-AQUEOUS SECONDARY BATTERY FUNCTIONAL LAYER, BATTERY MEMBER FOR NON-AQUEOUS SECONDARY BATTERY, METHOD OF PRODUCING LAMINATE FOR NON-AQUEOUS SECONDARY BATTERY, AND NON-AQUEOUS SECONDARY BATTERY

(71) Applicant: ZEON CORPORATION, Tokyo (JP)

(72) Inventors: Takumi Sugimoto, Tokyo (JP); Keiichiro Tanaka, Tokyo (JP)

(73) Assignee: ZEON CORPORATION, Tokyo (JP)

( * ) Notice: Subject to any disclaimer, the term of this patent is extended or adjusted under 35 U.S.C. 154(b) by 324 days.

(21) Appl. No.: 16/772,157

(22) PCT Filed: Dec. 18, 2018

(86) PCT No.: PCT/JP2018/046633
§ 371 (c)(1),
(2) Date: Jun. 12, 2020

(87) PCT Pub. No.: WO2019/131347
PCT Pub. Date: Jul. 4, 2019

(65) Prior Publication Data
US 2021/0075017 A1    Mar. 11, 2021

(30) Foreign Application Priority Data
Dec. 27, 2017    (JP) ................................. 2017-252432

(51) Int. Cl.
*H01M 4/60*    (2006.01)
*H01M 4/36*    (2006.01)
(Continued)

(52) U.S. Cl.
CPC ........... *H01M 4/606* (2013.01); *H01M 4/366* (2013.01); *H01M 10/0525* (2013.01);
(Continued)

(58) Field of Classification Search
CPC .... H01M 4/366; H01M 4/622; H01M 50/443; H01M 50/449
See application file for complete search history.

(56) References Cited

U.S. PATENT DOCUMENTS 8,852,788 B2    10/2014    Wakizaka et al.
10,141,557 B2    11/2018    Sasaki et al.
(Continued)

FOREIGN PATENT DOCUMENTS

CN    105659426 A    6/2016
EP    3163653 A1    5/2017
(Continued)

OTHER PUBLICATIONS

Jun. 30, 2020, International Preliminary Report on Patentability issued in the International Patent Application No. PCT/JP2018/046633.
(Continued)

*Primary Examiner* — Stephan J Essex
(74) *Attorney, Agent, or Firm* — KENJA IP LAW PC

(57) ABSTRACT

Provided is a composition for a non-aqueous secondary battery functional layer with which it is possible to form a functional layer that can cause a battery member for a non-aqueous secondary battery to display a balance of both high blocking resistance and high process adhesiveness. The composition for a non-aqueous secondary battery functional layer contains a particulate polymer having a core-shell structure including a core portion and a shell portion covering at least a portion of an outer surface of the core portion. The core portion is formed of a polymer A and the shell
(Continued)

portion is formed of a polymer B including not less than 1 mol % and not more than 30 mol % of a sulfo group-containing monomer unit.

7 Claims, 1 Drawing Sheet

(51) Int. Cl.
  *H01M 10/0525* (2010.01)
  *H01M 10/0585* (2010.01)
  *H01M 50/411* (2021.01)
  *H01M 50/443* (2021.01)
  *H01M 50/489* (2021.01)

(52) U.S. Cl.
  CPC ..... *H01M 10/0585* (2013.01); *H01M 50/411* (2021.01); *H01M 50/443* (2021.01); *H01M 50/489* (2021.01)

(56) References Cited

U.S. PATENT DOCUMENTS

| | | | |
|---|---|---|---|
| 10,388,930 B2 | 8/2019 | Sasaki | |
| 11,152,667 B2 | 10/2021 | Sasaki et al. | |
| 2013/0273421 A1 | 10/2013 | Matsumura et al. | |
| 2013/0330622 A1 | 12/2013 | Sasaki | |
| 2015/0188108 A1 | 7/2015 | Miyazawa et al. | |
| 2016/0141581 A1* | 5/2016 | Sasaki | H01M 10/0525 429/144 |
| 2016/0268565 A1 | 9/2016 | Sasaki et al. | |
| 2017/0256800 A1* | 9/2017 | Kaneda | C08F 212/08 |
| 2018/0053963 A1* | 2/2018 | Tanaka | H01M 50/409 |
| 2019/0319236 A1 | 10/2019 | Tanaka | |
| 2020/0335827 A1 | 10/2020 | Sugimoto et al. | |

FOREIGN PATENT DOCUMENTS

| | | | | |
|---|---|---|---|---|
| JP | 2013145763 A | 7/2013 | | |
| JP | 2015041606 A | 3/2015 | | |
| JP | 2016072247 A | 5/2016 | | |
| JP | 2016122648 A | 7/2016 | | |
| KR | 1020160030891 A | 3/2016 | | |
| KR | 1020160078967 A | 7/2016 | | |
| WO | 2011040474 A1 | 4/2011 | | |
| WO | 2012043812 A1 | 4/2012 | | |
| WO | 2012046843 A1 | 4/2012 | | |
| WO | 2012115096 A1 | 8/2012 | | |
| WO | 2015064411 A1 | 5/2015 | | |
| WO | 2015198530 A1 | 12/2015 | | |
| WO | WO-2016152026 A1 * | 9/2016 | ........ | H01M 10/0525 |
| WO | 2018096975 A1 | 5/2018 | | |
| WO | 2019131348 A1 | 7/2019 | | |

OTHER PUBLICATIONS

Nov. 15, 2021, the Extended European Search Report issued by the European Patent Office in the corresponding European Patent Application No. 18895979.5.

* cited by examiner

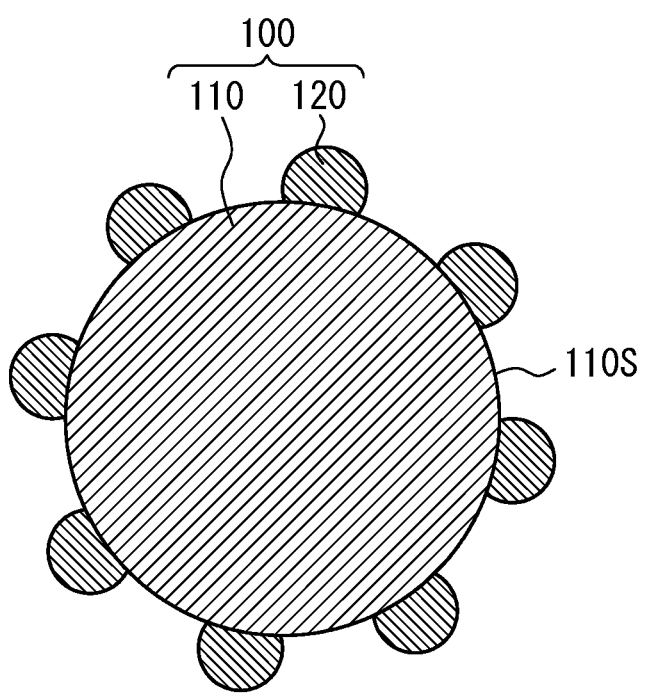

COMPOSITION FOR NON-AQUEOUS SECONDARY BATTERY FUNCTIONAL LAYER, BATTERY MEMBER FOR NON-AQUEOUS SECONDARY BATTERY, METHOD OF PRODUCING LAMINATE FOR NON-AQUEOUS SECONDARY BATTERY, AND NON-AQUEOUS SECONDARY BATTERY

TECHNICAL FIELD

The present disclosure relates to a composition for a non-aqueous secondary battery functional layer, a battery member for a non-aqueous secondary battery, a method of producing a laminate for a non-aqueous secondary battery, and a non-aqueous secondary battery.

BACKGROUND

Non-aqueous secondary batteries (hereinafter, also referred to simply as "secondary batteries") such as lithium ion secondary batteries have characteristics such as compact size, light weight, high energy-density, and the ability to be repeatedly charged and discharged, and are used in a wide variety of applications. A non-aqueous secondary battery generally includes battery members such as a positive electrode, a negative electrode, and a separator that isolates the positive electrode and the negative electrode from one another and prevents short circuiting between the positive and negative electrodes.

In recent years, battery members that include a porous membrane layer for improving heat resistance and strength, an adhesive layer for adhering battery members to one another, or the like (hereinafter, such layers are also referred to by the general term "functional layer") have been used in secondary batteries. Specifically, electrodes that further include a functional layer formed on an electrode substrate in which an electrode mixed material layer is provided on a current collector and separators that include a functional layer formed on a separator substrate have been used as battery members.

For example, Patent Literature (PTL) 1 and 2 each disclose a separator including a layer of a specific thermoplastic polymer. These documents also disclose that a polymer having a core-shell structure can be used as the thermoplastic polymer. In another example, PTL 3 discloses that a shell portion of partially covered core-shell particles includes 75 mass % to 100 mass % (43 mol % to 100 mol %) of sodium styrene sulfonate.

CITATION LIST

Patent Literature

PTL 1: JP201672247A
PTL 2: JP2016122648A
PTL 3: WO2015/064411 A1

SUMMARY

Technical Problem

In the production process of a secondary battery, a battery member produced in an elongated form is typically wound up as produced to then be stored and transported. However, when a battery member that includes a functional layer is stored and transported in a wound up state, adjacent battery members may become stuck together via the functional layer (i.e., blocking may occur), leading to the occurrence of faults and reduction of productivity. Therefore, it is desirable for a battery member that includes a functional layer to display performance in terms of inhibiting blocking during a production process (i.e., to have blocking resistance).

On the other hand, there are cases where, in the production process of a secondary battery, battery members that have not yet been immersed in electrolyte solution are stacked under strong pressing conditions by roll pressing or the like, and are then cut to a desired size as necessary and/or transported as a laminate. During this cutting or transportation, misalignment or the like of the stacked battery members may occur, leading to problems such as the occurrence of faults and reduction of productivity. Therefore, it is desirable for a battery member that includes a functional layer to ensure blocking resistance as described above while also, on the other hand, providing high adhesiveness between battery members in the production process of a secondary battery (i.e., process adhesiveness).

However, the battery members described in PTL 1 and 2 that each include a layer of a specific thermoplastic polymer as a functional layer leave room for improvement in terms of achieving a balance of high levels of both blocking resistance and process adhesiveness between battery members in the production process of a secondary battery. Moreover, the partially covered core-shell particles described in PTL 3 leave room for improvement in terms of forming a functional layer that can cause a battery member to display a balance of both high blocking resistance and high process adhesiveness, because the shell portion of the partially covered core-shell particles includes a large amount of sodium styrene sulfonate.

Accordingly, an object of the present disclosure is to provide a composition for a non-aqueous secondary battery functional layer with which it is possible to form a functional layer that can cause a battery member for a non-aqueous secondary battery to display a balance of both high blocking resistance and high process adhesiveness.

Another object of the present disclosure is to provide a battery member for a non-aqueous secondary battery that can display a balance of both high blocking resistance and high process adhesiveness, a method of producing a laminate for a non-aqueous secondary battery including this battery member for a non-aqueous secondary battery, and a non-aqueous secondary battery including this battery member for a non-aqueous secondary battery.

Solution to Problem

The inventors conducted diligent investigation with the aim of solving the problem set forth above. The inventors found that by using a composition for a non-aqueous secondary battery functional layer that contains a core-shell structure particulate polymer including a specific shell portion, it is possible to form a non-aqueous secondary battery functional layer that can cause a battery member for a non-aqueous secondary battery to display a balance of both high blocking resistance and high process adhesiveness, and, in this manner, the inventors completed the present disclosure.

Specifically, the present disclosure aims to advantageously solve the problem set forth above, and a presently disclosed composition for a non-aqueous secondary battery functional layer comprises a particulate polymer, wherein the particulate polymer has a core-shell structure including a core portion and a shell portion covering at least a portion of an outer surface of the core portion, the core portion is formed of a polymer A, and the shell portion is formed of a polymer B including not less than 1 mol % and not more than 30 mol % of a sulfo group-containing monomer unit. When a composition for a non-aqueous secondary battery functional layer contains a core-shell structure particulate polymer including the specific shell portion set forth above in this manner, a battery member for a non-aqueous secondary battery that includes a functional layer formed from the composition for a non-aqueous secondary battery functional layer can be caused to display a balance of both high blocking resistance and high process adhesiveness.

Note that the "content (mol %) of a sulfo group-containing monomer unit in a shell portion" referred to in the present disclosure can be measured using a measurement method described in the EXAMPLES section of the present specification.

In the presently disclosed composition for a non-aqueous secondary battery functional layer, the shell portion preferably partially covers the outer surface of the core portion. Through inclusion of a particulate polymer in which the shell portion partially covers the core portion, it is possible to further improve blocking resistance and process adhesiveness of a battery member for a non-aqueous secondary battery that includes a functional layer formed from the composition for a non-aqueous secondary battery functional layer.

In the presently disclosed composition for a non-aqueous secondary battery functional layer, the polymer A preferably includes a (meth)acrylic acid ester monomer unit. When the polymer A includes a (meth)acrylic acid ester monomer unit, a battery member for a non-aqueous secondary battery that includes a functional layer formed from the composition for a non-aqueous secondary battery functional layer can be caused to display an even better balance of both high blocking resistance and high process adhesiveness.

Note that in the present disclosure, "(meth)acryl" is used to indicate "acryl" and/or "methacryl".

In the presently disclosed composition for a non-aqueous secondary battery functional layer, the particulate polymer preferably has a volume-average particle diameter of not less than 0.05 μm and not more than 1.5 μm. When the volume-average particle diameter of the particulate polymer is within the range set forth above, it is possible to further improve process adhesiveness of a battery member for a non-aqueous secondary battery that includes a functional layer formed from the composition for a non-aqueous secondary battery functional layer and also to improve rate characteristics of a non-aqueous secondary battery that includes the battery member for a non-aqueous secondary battery.

Note that the term "volume-average particle diameter" as used in the present disclosure refers to a particle diameter (D50) at which, in a particle size distribution (volume basis) measured by laser diffraction, cumulative volume calculated from the small diameter end of the distribution reaches 50%.

The presently disclosed composition for a non-aqueous secondary battery functional layer preferably further comprises a binder, wherein not less than 1 part by mass and not more than 30 parts by mass of the binder is contained per 100 parts by mass of the particulate polymer. When the composition for a non-aqueous secondary battery functional layer further contains the specific amount of a binder set forth above, it is possible to improve dusting resistance of a functional layer that is formed from the composition for a non-aqueous secondary battery functional layer and also to further improve blocking resistance and process adhesiveness of a battery member for a non-aqueous secondary battery that includes the functional layer.

The present disclosure also aims to advantageously solve the problem set forth above, and a presently disclosed battery member for a non-aqueous secondary battery comprises a non-aqueous secondary battery functional layer formed using any one of the compositions for a non-aqueous secondary battery functional layer set forth above. By using a composition for a non-aqueous secondary battery functional layer that contains a core-shell structure particulate polymer including the specific shell portion set forth above in this manner, it is possible to obtain a battery member for a non-aqueous secondary battery that can display a balance of both high blocking resistance and high process adhesiveness.

The present disclosure also aims to advantageously solve the problem set forth above, and a presently disclosed method of producing a laminate for a non-aqueous secondary battery in which a separator and an electrode are stacked and in which at least one of the separator and the electrode is the battery member for a non-aqueous secondary battery set forth above, comprises: a stacking step of stacking the separator and the electrode; and an adhering step of pressing the separator and the electrode that have been stacked to adhere the separator and the electrode. Through a method of producing a laminate for a non-aqueous secondary battery that includes the specific steps set forth above and in which the battery member for a non-aqueous secondary battery set forth above is used as at least one of a separator and an electrode in this manner, it is possible to produce, with high productivity, a laminate for a non-aqueous secondary battery including a battery member for a non-aqueous secondary battery that can display a balance of both high blocking resistance and high process adhesiveness and with which a high-performance non-aqueous secondary battery can be obtained.

The present disclosure also aims to advantageously solve the problems set forth above by disclosing a non-aqueous secondary battery comprising the battery member for a non-aqueous secondary battery set forth above. The presently disclosed non-aqueous secondary battery has high performance and includes a battery member for a non-aqueous secondary battery that can display a balance of both high blocking resistance and high process adhesiveness.

Advantageous Effect

According to the present disclosure, it is possible to provide a composition for a non-aqueous secondary battery functional layer with which it is possible to form a functional layer that can cause a battery member for a non-aqueous secondary battery to display a balance of both high blocking resistance and high process adhesiveness.

Moreover, according to the present disclosure, it is possible to provide a battery member for a non-aqueous secondary battery that can display a balance of both high blocking resistance and high process adhesiveness, a method of producing a laminate for a non-aqueous secondary battery including this battery member for a non-aqueous secondary battery, and a non-aqueous secondary battery including this battery member for a non-aqueous secondary battery.

BRIEF DESCRIPTION OF THE DRAWING

In the accompanying drawing,

FIG. 1 is a cross-sectional view schematically illustrating the structure of one example of a particulate polymer contained in the presently disclosed composition for a non-aqueous secondary battery functional layer.

DETAILED DESCRIPTION

The following provides a detailed description of embodiments of the present disclosure.

The presently disclosed composition for a non-aqueous secondary battery functional layer is used as a material in production of a non-aqueous secondary battery functional layer. Moreover, the presently disclosed battery member for a non-aqueous secondary battery is a battery member that includes a non-aqueous secondary battery functional layer produced using the presently disclosed composition for a non-aqueous secondary battery functional layer. Furthermore, the presently disclosed non-aqueous secondary battery is a secondary battery that includes at least the presently disclosed battery member for a non-aqueous secondary battery. Also, a laminate produced by the presently disclosed method of producing a laminate for a non-aqueous secondary battery is a laminate in which a separator and an electrode are stacked and in which at least one of the separator and the electrode is the presently disclosed battery member for a non-aqueous secondary battery. This laminate can be used to produce the presently disclosed non-aqueous secondary battery since it includes the presently disclosed battery member for a non-aqueous secondary battery as described above.

(Composition for Non-Aqueous Secondary Battery Functional Layer)

The presently disclosed composition for a non-aqueous secondary battery functional layer is a slurry composition that contains a particulate polymer having a core-shell structure, that optionally contains a binder and other components, and that has water or the like as a dispersion medium. Features of the particulate polymer contained in the presently disclosed composition for a non-aqueous secondary battery functional layer are that the particulate polymer has a core-shell structure including a core portion and a shell portion covering at least a portion of an outer surface of the core portion, the core portion is formed of a polymer A, and the shell portion is formed of a polymer B including a specific amount of a sulfo group-containing monomer unit.

As a result of the presently disclosed composition for a non-aqueous secondary battery functional layer containing a core-shell structure particulate polymer including the specific shell portion set forth above, a battery member for a non-aqueous secondary battery that includes a functional layer formed from the composition for a non-aqueous secondary battery functional layer can be caused to display a balance of both high blocking resistance and high process adhesiveness.

<Particulate Polymer>

The particulate polymer is a component that can impart high blocking resistance and high process adhesiveness to a battery member for a non-aqueous secondary battery that includes a functional layer obtained from the composition for a functional layer containing the particulate polymer.

<<Structure of Particulate Polymer>>

The particulate polymer has a core-shell structure including a core portion and a shell portion covering at least a portion of an outer surface of the core portion. It is preferable that the shell portion partially covers the outer surface of the core portion from a viewpoint of further improving blocking resistance and process adhesiveness of a battery member for a non-aqueous secondary battery that includes a functional layer. In other words, it is preferable that the shell portion of the particulate polymer covers part of the outer surface of the core portion but does not completely cover the outer surface of the core portion. In terms of external appearance, even in a situation in which the outer surface of the core portion appears to be completely covered by the shell portion, the shell portion is still considered to be a shell portion that partially covers the outer surface of the core portion so long as pores are formed that pass between inside and outside of the shell portion. Accordingly, a particulate polymer that includes a shell portion having fine pores that pass between an outer surface of the shell portion (i.e., a circumferential surface of the particulate polymer) and an outer surface of a core portion, for example, also corresponds to the preferred particulate polymer set forth above in which the shell portion partially covers the outer surface of the core portion.

FIG. 1 illustrates cross-sectional structure of one example of the preferred particulate polymer. A particulate polymer 100 illustrated in FIG. 1 has a core-shell structure including a core portion 110 and a shell portion 120. The core portion 110 is a portion that is further inward than the shell portion 120 in the particulate polymer 100. The shell portion 120 is a portion that covers an outer surface 110S of the core portion 110 and is normally an outermost portion in the particulate polymer 100. The shell portion 120 partially covers the outer surface 110S of the core portion 110, but does not completely cover the outer surface 110S of the core portion 110. Moreover, the shell portion 120 is preferably in a particulate form as illustrated in FIG. 1.

Note that the particulate polymer may include any constituent element other than the core portion and the shell portion described above so long as the expected effects are not significantly lost as a result. Specifically, the particulate polymer may, for example, include a portion inside of the core portion that is formed of a different polymer to the core portion. In one specific example, a residual seed particle may be present inside of the core portion in a situation in which seed particles are used in production of the particulate polymer by seeded polymerization. However, from a viewpoint of more noticeably displaying the expected effects, it is preferable that the particulate polymer is composed of only the core portion and the shell portion.

Although no specific limitations are placed on the proportion constituted by the core portion (core proportion) among the total of the core portion and the shell portion in the particulate polymer, the core proportion is preferably 30 mass % or more, more preferably 40 mass % or more, and particularly preferably 50 mass % or more, and is preferably 80 mass % or less, more preferably 75 mass % or less, and particularly preferably 70 mass % or less. When the core proportion in the particulate polymer is 30 mass % or more, it is possible to ensure blocking resistance and process adhesiveness of a battery member for a non-aqueous secondary battery that includes a functional layer. On the other hand, when the core proportion in the particulate polymer is 80 mass % or less, reduction of process adhesiveness of a battery member for a non-aqueous secondary battery that includes a functional layer can be inhibited.

[Core Portion]

—Form—

The form of the core portion is not specifically limited so long as it is formed of the polymer A.

—Chemical Composition—

Examples of monomers that can be used to produce the polymer A forming the core portion include, but are not specifically limited to, (meth)acrylic acid ester monomers such as methyl acrylate, ethyl acrylate, butyl acrylate (BA), 2-ethylhexyl acrylate, methyl methacrylate (MMA), ethyl methacrylate, butyl methacrylate, and cyclohexyl methacrylate; vinyl chloride monomers such as vinyl chloride and vinylidene chloride; vinyl acetate monomers such as vinyl acetate; aromatic vinyl monomers such as styrene, α-methylstyrene, styrene sulfonic acid, butoxystyrene, and vinylnaphthalene; vinylamine monomers such as vinylamine; vinylamide monomers such as N-vinylformamide and N-vinylacetamide; (meth)acrylamide monomers such as acrylamide and methacrylamide; (meth)acrylonitrile monomers such as acrylonitrile and methacrylonitrile; fluorine-containing (meth)acrylic acid ester monomers such as 2-(perfluorohexyl)ethyl methacrylate and 2-(perfluorobutyl) ethyl acrylate; maleimide; and maleimide derivatives such as phenylmaleimide. One of these monomers may be used individually, or two or more of these monomers may be used in combination in a freely selected ratio.

Note that in the present disclosure, "(meth)acrylonitrile" is used to indicate "acrylonitrile" and/or "methacrylonitrile".

Moreover, "(meth)acrylic acid ester monomers" are not considered to include "di(meth)acrylic acid ester monomers" and "tri(meth)acrylic acid ester monomers" that can be used as subsequently described "cross-linkable monomers".

Of these monomers, the use of a (meth)acrylic acid ester monomer as a monomer used to produce the polymer A of the core portion is more preferable from a viewpoint of further improving blocking resistance and process adhesiveness of a battery member for a non-aqueous secondary battery that includes a functional layer. In other words, the polymer A of the core portion preferably includes a (meth) acrylic acid ester monomer unit.

The phrase "includes a monomer unit" as used in the present disclosure means that "a polymer obtained with the monomer includes a repeating unit derived from the monomer".

The proportion constituted by the (meth)acrylic acid ester monomer unit in the polymer A forming the core portion is not specifically limited but, from a viewpoint of further improving blocking resistance and process adhesiveness of a battery member for a non-aqueous secondary battery that includes a functional layer, is preferably 20 mass % or more, more preferably 30 mass % or more, and particularly preferably 40 mass % or more, and is preferably 95 mass % or less, more preferably 75 mass % or less, and particularly preferably 60 mass % or less.

The polymer A forming the core portion may include a hydrophilic group-containing monomer unit. Examples of hydrophilic group-containing monomers include monomers that include an acid group and monomers that include a hydroxy group.

Examples of monomers that include an acid group (acid group-containing monomers) include carboxy group-containing monomers, sulfo group-containing monomers, and phosphate group-containing monomers.

Moreover, examples of carboxy group-containing monomers include monocarboxylic acids and dicarboxylic acids. Examples of monocarboxylic acids include acrylic acid, methacrylic acid, and crotonic acid. Examples of dicarboxylic acids include maleic acid, fumaric acid, and itaconic acid.

Examples of sulfo group-containing monomers include vinyl sulfonic acid, methyl vinyl sulfonic acid, (meth)allyl sulfonic acid, salts of styrene sulfonic acid, (meth)acrylic acid 2-sulfoethyl, 2-acrylamido-2-methylpropane sulfonic acid, and 3-allyloxy-2-hydroxypropane sulfonic acid.

Examples of phosphate group-containing monomers include 2-(meth)acryloyloxyethyl phosphate, methyl-2-(meth)acryloyloxyethyl phosphate, and ethyl-(meth)acryloyloxyethyl phosphate.

Note that in the present disclosure, "(meth)allyl" is used to indicate "allyl" and/or "methallyl", whereas "(meth) acryloyl" is used to indicate "acryloyl" and/or "methacryloyl".

Of these acid group-containing monomers, carboxy group-containing monomers are preferable, of which, monocarboxylic acids are preferable, and (meth)acrylic acid is more preferable.

One acid group-containing monomer may be used individually, or two or more acid group-containing monomers may be used in combination in a freely selected ratio.

Examples of monomers that include a hydroxy group include 2-hydroxyethyl acrylate, 2-hydroxypropyl acrylate, 2-hydroxyethyl methacrylate, and 2-hydroxypropyl methacrylate.

The proportion constituted by an acid group-containing monomer unit in the polymer A forming the core portion is not specifically limited but is preferably 0.1 mass % or more, more preferably 0.5 mass % or more, and particularly preferably 3 mass % or more, and is preferably 10 mass % or less, more preferably 5 mass % or less, and particularly preferably 4 mass % or less. By setting the proportion constituted by the acid group-containing monomer unit within any of the ranges set forth above, it is possible to increase dispersibility of the polymer A forming the core portion and, with respect to the outer surface of the polymer A forming the core portion, facilitate formation of a shell portion covering the outer surface of the core portion in production of the particulate polymer.

The polymer A forming the core portion preferably includes a cross-linkable monomer unit in addition to the monomer units described above. A cross-linkable monomer is a monomer that can form a cross-linked structure during or after polymerization by heating or by irradiation with energy rays. The inclusion of a cross-linkable monomer unit in the polymer A forming the core portion makes it easier to set the subsequently described degree of swelling in electrolyte solution of the polymer A forming the core portion within a preferred range.

Examples of cross-linkable monomers that can be used include polyfunctional monomers having at least two groups that display polymerization reactivity in the monomer. Examples of such polyfunctional monomers include divinyl monomers such as divinylbenzene, 1,3-butadiene, isoprene, and allyl methacrylate; di(meth)acrylic acid ester monomers such as ethylene dimethacrylate, diethylene glycol dimethacrylate, ethylene glycol dimethacrylate (EDMA), diethylene glycol diacrylate, and 1,3-butylene glycol diacrylate; tri(meth)acrylic acid ester monomers such as trimethylolpropane trimethacrylate and trimethylolpropane triacrylate; epoxy group-containing ethylenically unsaturated monomers such as allyl glycidyl ether and glycidyl methacrylate; and γ-methacryloxypropyltrimethoxysilane. Of these cross-linkable monomers, di(meth)acrylic acid ester monomers are more preferable from a viewpoint that the degree of swelling in electrolyte solution of the polymer A forming the core portion can easily be controlled. One of these cross-linkable monomers may be used individually, or two or more of these cross-linkable monomers may be used in combination in a freely selected ratio.

The proportion constituted by the cross-linkable monomer unit in the polymer A forming the core portion is not specifically limited but is preferably 0.1 mass % or more, more preferably 0.2 mass % or more, particularly preferably 0.5 mass % or more, and most preferably 1 mass % or more from a viewpoint of improving adhesiveness of a battery member for a non-aqueous secondary battery that includes a functional layer and that is immersed in electrolyte solution after secondary battery production (i.e., wet adhesiveness), and is preferably 10 mass % or less, more preferably 5 mass % or less, particularly preferably 3 mass % or less, and most preferably 2 mass % or less from a viewpoint of controlling the degree of swelling in electrolyte solution of the polymer A forming the core portion and improving rate characteristics of a battery member for a non-aqueous secondary battery that includes a functional layer.

—Glass-Transition Temperature—

The glass-transition temperature of the polymer A forming the core portion is not specifically limited but is preferably 25° C. or higher, more preferably 30° C. or higher, particularly preferably 35° C. or higher, and most preferably 40° C. or higher, and is preferably 90° C. or lower, more preferably 80° C. or lower, particularly preferably 70° C. or lower, and most preferably 50° C. or lower. When the glass-transition temperature of the polymer A forming the core portion is 25° C. or higher, reduction of blocking resistance of a battery member for a non-aqueous secondary battery that includes a functional layer can be inhibited. On the other hand, when the glass-transition temperature of the polymer A forming the core portion is 90° C. or lower, reduction of process adhesiveness can be inhibited.

—Degree of Swelling in Electrolyte Solution—

The degree of swelling in electrolyte solution of the polymer A forming the core portion is not specifically limited but is preferably 150 mass % or more, more preferably 170 mass % or more, particularly preferably 200 mass % or more, and most preferably 300 mass % or more, and is preferably 1200 mass % or less, more preferably 1000 mass % or less, particularly preferably 800 mass % or less, and most preferably 400 mass % or less. When the degree of swelling in electrolyte solution of the polymer A forming the core portion is 150 mass % or more, the polymer A forming the core portion swells to an appropriate degree in electrolyte solution, and adhesiveness of a battery member for a non-aqueous secondary battery that includes a functional layer and that is immersed in electrolyte solution after secondary battery production (i.e., wet adhesiveness) can be improved. On the other hand, when the degree of swelling in electrolyte solution of the polymer A forming the core portion is 1200 mass % or less, deterioration of rate characteristics of a battery member for a non-aqueous secondary battery that includes a functional layer can be inhibited.

The "degree of swelling in electrolyte solution" referred to in the present disclosure can be measured using a measurement method described in the EXAMPLES section of the present specification.

Moreover, the degree of swelling in electrolyte solution of the polymer A forming the core portion can be set within a desired range through adjustment of the types and/or amounts of used monomers and so forth in production of the core portion of the particulate polymer, for example.

[Shell Portion]

—Form—

The form of the shell portion is not specifically limited so long as it is formed of the polymer B. For example, the shell portion may be formed of particles of the polymer B. In a case in which the shell portion is formed of particles of the polymer B, a plurality of the particles forming the shell portion may overlap in a radial direction of the particulate polymer. However, it is preferable that the particles of the polymer B form the shell portion as a monolayer without there being overlapping of particles forming the shell portion in the radial direction of the particulate polymer.

Note that the polymer B forming the shell portion is a polymer having a different chemical composition to the polymer A forming the core portion.

—Chemical Composition—

Monomers used to produce the polymer B forming the shell portion can be selected as appropriate as monomers including a specific amount of a sulfo group-containing monomer.

Examples of sulfo group-containing monomers include vinyl sulfonic acid, methyl vinyl sulfonic acid, (meth)allyl sulfonic acid, salts of styrene sulfonic acid, (meth)acrylic acid 2-sulfoethyl, 2-acrylamido-2-methylpropane sulfonic acid, and 3-allyloxy-2-hydroxypropane sulfonic acid in the same way as for the examples of monomers that can be used to produce the polymer A forming the core portion. One of these sulfo group-containing monomers may be used individually, or two or more of these sulfo group-containing monomers may be used in combination in a freely selected ratio.

Of these sulfo group-containing monomers, 2-acrylamido-2-methylpropane sulfonic acid and salts of styrene sulfonic acid such as lithium styrene sulfonate are preferable from a viewpoint of general applicability.

The proportion constituted by a sulfo group-containing monomer unit in the polymer B forming the shell portion is required to be not less than 1 mol % and not more than 30 mol %, is preferably 1.5 mol % or more, more preferably 2 mol % or more, particularly preferably 3 mol % or more, and most preferably 4 mol % or more, and is preferably 25 mol % or less, more preferably 20 mol % or less, particularly preferably 10 mol % or less, and most preferably 5 mol % or less. When the proportion constituted by the sulfo group-containing monomer unit in the polymer B forming the shell portion is not less than any of the lower limits set forth above, process adhesiveness of a battery member for a non-aqueous secondary battery can be improved, and dusting resistance of a functional layer formed from the composition for a non-aqueous secondary battery functional layer can be improved due to improved adhesiveness with a subsequently described binder. On the other hand, when the proportion constituted by the sulfo group-containing monomer unit in the polymer B forming the shell portion is not more than any of the upper limits set forth above, the particulate polymer forms a core-shell structure, blocking resistance of a battery member for a non-aqueous secondary battery can be improved, and rate characteristics of a non-aqueous secondary battery including the battery member for a non-aqueous secondary battery can be improved since the particulate polymer having reduced water-solubility ensures porosity of the battery member for a non-aqueous secondary battery.

Examples of monomers other than sulfo group-containing monomers that can be used to produce the polymer B of the shell portion include the same monomers as given as examples of monomers that can be used to produce the polymer A of the core portion ((meth)acrylic acid ester monomers; vinyl chloride monomers; vinyl acetate monomers; aromatic vinyl monomers; vinylamine monomers; vinylamide monomers; (meth)acrylamide monomers; (meth)acrylonitrile monomers; fluorine-containing (meth) acrylic acid ester monomers; maleimide; maleimide derivatives; etc.). One of these monomers may be used individually, or two or more of these monomers may be used in combination in a freely selected ratio.

Of these monomers, aromatic vinyl monomers such as styrene, (meth)acrylic acid monomers such as methacrylic acid, (meth)acrylic acid ester monomers such as methyl methacrylate, and (meth)acrylonitrile monomers such as acrylonitrile are more preferable from a viewpoint of electrolyte solution resistance.

The proportion constituted by an aromatic vinyl monomer in the polymer B forming the shell portion is preferably 60 mol % or more, more preferably 70 mol % or more, particularly preferably 74 mol % or more, and most preferably 89 mol % or more, and is preferably 99 mol % or less, more preferably 97.5 mol % or less, particularly preferably 95 mol % or less, and most preferably 94 mol % or less. When the proportion constituted by the aromatic vinyl monomer in the polymer B forming the shell portion is not less than any of the lower limits set forth above, wet adhesive strength can be improved. On the other hand, when the proportion constituted by the aromatic vinyl monomer in the polymer B forming the shell portion is not more than any of the upper limits set forth above, the particulate polymer can stably be obtained.

The proportion constituted by a (meth)acrylic acid monomer in the polymer B forming the shell portion is preferably 0.1 mol % or more, more preferably 0.5 mol % or more, and particularly preferably 1 mol % or more, and is preferably 10 mol % or less, and more preferably 5 mol % or less. When the proportion constituted by the (meth)acrylic acid monomer in the polymer B forming the shell portion is not less than any of the lower limits set forth above and not more than any of the upper limits set forth above, the particulate polymer can stably be obtained.

The proportion constituted by a (meth)acrylic acid ester monomer in the polymer B forming the shell portion is preferably 0.1 mol % or more, more preferably 0.5 mol % or more, and particularly preferably 5 mol % or more, and is preferably 10 mol % or less, and more preferably 6 mol % or less. When the proportion constituted by the (meth)acrylic acid ester monomer in the polymer B forming the shell portion is not less than any of the lower limits set forth above, process adhesiveness can be increased. On the other hand, when the proportion constituted by the (meth)acrylic acid ester monomer in the polymer B forming the shell portion is not more than any of the upper limits set forth above, blocking resistance can be increased.

The proportion constituted by a (meth)acrylonitrile monomer in the polymer B forming the shell portion is preferably 60 mol % or more, more preferably 70 mol % or more, and particularly preferably 94 mol % or more, and is preferably 99 mol % or less, and more preferably 95 mol % or less. When the proportion constituted by the (meth)acrylonitrile monomer in the polymer B forming the shell portion is not less than any of the lower limits set forth above, wet adhesive strength can be improved. On the other hand, when the proportion constituted by the (meth)acrylonitrile monomer in the polymer B forming the shell portion is not more than any of the upper limits set forth above, the particulate polymer can stably be obtained.

—Glass-Transition Temperature—

The glass-transition temperature of the polymer B forming the shell portion is not specifically limited but is preferably 90° C. or higher, more preferably 95° C. or higher, particularly preferably 97° C. or higher, and most preferably 100° C. or higher, and is preferably 200° C. or lower, more preferably 150° C. or lower, particularly preferably 120° C. or lower, and most preferably 102° C. or lower. When the glass-transition temperature of the polymer B forming the shell portion is 90° C. or higher, reduction of blocking resistance of a battery member for a non-aqueous secondary battery that includes a functional layer can be inhibited, and rate characteristics of a non-aqueous secondary battery can be improved. On the other hand, when the glass-transition temperature of the polymer B forming the shell portion is 200° C. or lower, reduction of process adhesiveness of a battery member for a non-aqueous secondary battery that includes a functional layer can be inhibited.

<<Properties of Particulate Polymer>>

The volume-average particle diameter of the particulate polymer is preferably 0.05 μm or more, more preferably 0.2 μm or more, particularly preferably 0.3 μm or more, and most preferably 0.5 μm or more from a viewpoint of the particulate polymer ensuring porosity of a battery member for a non-aqueous secondary battery and improving rate characteristics of a non-aqueous secondary battery that includes the battery member for a non-aqueous secondary battery. Moreover, the volume-average particle diameter of the particulate polymer is preferably 1.5 μm or less, more preferably 1.0 μm or less, and particularly preferably 0.7 μm or less from a viewpoint of further improving process adhesiveness of a battery member for a non-aqueous secondary battery that includes a functional layer.

Note that the volume-average particle diameter of the particulate polymer can be set within a desired range by adjusting the amount of emulsifier, the amounts of monomers, and so forth, for example, in production of the core portion and/or the shell portion of the particulate polymer.

<<Production Method of Particulate Polymer>>

The particulate polymer having the core-shell structure set forth above can be produced by, for example, performing stepwise polymerization using monomer for the polymer A of the core portion and monomer for the polymer B of the shell portion and changing the ratio of these monomers over time. Specifically, the particulate polymer can be produced by continuous, multi-step emulsion polymerization or multi-step suspension polymerization in which a polymer of a preceding step is then covered by a polymer of a succeeding step.

The following describes one example of a case in which the particulate polymer having the core-shell structure described above is obtained by multi-step emulsion polymerization.

In the polymerization, an anionic surfactant such as sodium dodecylbenzenesulfonate or sodium dodecyl sulfate, a non-ionic surfactant such as polyoxyethylene nonylphenyl ether or sorbitan monolaurate, or a cationic surfactant such as octadecylamine acetate may be used as an emulsifier in accordance with a standard method. Moreover, a peroxide such as t-butyl peroxy-2-ethylhexanoate, potassium persulfate, or cumene peroxide, or an azo compound such as 2,2'-azobis(2-methyl-N-(2-hydroxyethyl)-propionamide) or 2,2'-azobis(2-amidinopropane) hydrochloride can be used as a polymerization initiator, for example.

The polymerization procedure involves initially mixing monomers for forming the core portion and the emulsifier, and performing emulsion polymerization as one batch to obtain a particulate polymer that forms the core portion. The particulate polymer having the core-shell structure set forth above can then be obtained by performing polymerization of monomers for forming the shell portion in the presence of the particulate polymer forming the core portion.

In this polymerization, it is preferable that the monomers for forming the polymer of the shell portion are supplied into the polymerization system continuously or divided into a plurality of portions from a viewpoint of partially covering the outer surface of the core portion with the shell portion.

As a result of the monomers for forming the polymer of the shell portion being supplied into the polymerization system in portions or continuously, the polymer forming the shell portion can be formed as particles that bond to the core portion such as to form a shell portion that partially covers the core portion.

<Other Components>

No specific limitations are placed on components other than the particulate polymer that can be contained in the presently disclosed composition for a non-aqueous secondary battery functional layer. Examples of such components include binders and known additives. Components such as non-conductive particles, surface tension modifiers, dispersants, viscosity modifiers, reinforcing materials, and additives for electrolyte solution may be contained as known additives without any specific limitations. These components are not specifically limited so long as they do not influence battery reactions and can be commonly known components such as non-conductive particles described in JP2015041606A and components other than non-conductive particles described in WO2012/115096A1. One of these components may be used individually, or two or more of these components may be used in combination in a freely selected ratio.

<<Binder>>

The use of a binder can improve dusting resistance of a functional layer formed from the composition for a non-aqueous secondary battery functional layer. It should be noted that the term "binder" is not inclusive of the particulate polymer set forth above.

Examples of binders that can be used depending on the location where a functional layer is to be provided include fluoropolymers (polymers including mainly a fluorine-containing monomer unit) such as polyvinylidene fluoride (PVdF); aromatic vinyl/aliphatic conjugated diene copolymers (polymers including mainly an aromatic vinyl monomer unit and an aliphatic conjugated diene monomer unit) such as styrene-butadiene copolymer (SBR) and hydrogenated products thereof; aliphatic conjugated diene/acrylonitrile copolymers such as butadiene-acrylonitrile copolymer (NBR) and hydrogenated products thereof; polymers including a (meth)acrylic acid ester monomer unit (acrylic polymers); and polyvinyl alcohol polymers such as polyvinyl alcohol (PVA).

Known monomers can be used as monomers that can form the various monomer units described above. Examples of (meth)acrylic acid ester monomers that can be used to form a (meth)acrylic acid ester monomer unit include the same monomers as can be used to produce the polymer A of the core portion of the particulate polymer. Note that when a polymer is said to "mainly include" one type or a plurality of types of monomer units in the present disclosure, this means that "the proportion in which the one type of monomer unit is included or the total proportion in which the plurality of types of monomer units are included is more than 50 mass % when the amount of all monomer units included in the polymer is taken to be 100 mass %".

The content of the binder per 100 parts by mass of the particulate polymer is preferably 1 part by mass or more, more preferably 5 parts by mass or more, and particularly preferably 10 parts by mass or more, and is preferably 30 parts by mass or less, more preferably 25 parts by mass or less, and particularly preferably 20 parts by mass or less. When the content of the binder is 1 part by mass or more, it is possible to improve adhesiveness to a battery member for a non-aqueous secondary battery and improve process adhesiveness of a battery member for a non-aqueous secondary battery, and it is also possible to improve dusting resistance of a functional layer formed from the composition for a non-aqueous secondary battery functional layer. On the other hand, when the content of the binder is 30 parts by mass or less, it is possible to ensure porosity of a battery member for a non-aqueous secondary battery and improve rate characteristics of a non-aqueous secondary battery that includes the battery member for a non-aqueous secondary battery, and it is also possible to restrict the increase of a low-Tg component and improve blocking resistance of a battery member for a non-aqueous secondary battery that includes a functional layer.

The glass-transition temperature of the binder is preferably −40° C. or higher, more preferably −20° C. or higher, particularly preferably −10° C. or higher, and most preferably 0° C. or higher, and is preferably 20° C. or lower, more preferably 15° C. or lower, particularly preferably 10° C. or lower, and most preferably 2° C. or lower. When the glass-transition temperature of the binder is not lower than the lower limit of any of the ranges set forth above, blocking resistance of a battery member for a non-aqueous secondary battery that includes a functional layer can be improved. Moreover, when the glass-transition temperature of the binder is not higher than the upper limit of any of the ranges set forth above, dusting resistance of a functional layer formed from the composition for a non-aqueous secondary battery functional layer can be improved, and process adhesiveness of a battery member for a non-aqueous secondary battery that includes the functional layer can be improved.

Examples of methods by which the binder can be produced include solution polymerization, suspension polymerization, and emulsion polymerization. Of these methods, emulsion polymerization and suspension polymerization are preferable in terms that polymerization can be carried out in water and a resultant water dispersion containing a particulate polymer can be suitably used, as produced, as a material for the composition for a non-aqueous secondary battery functional layer. In production of the polymer used as the binder, it is preferable that a dispersant is present in the reaction system. In general, the binder is substantially composed by the constituent polymer thereof, but may also be accompanied by other optional components such as an additive used in polymerization.

<Production Method of Composition for Non-Aqueous Secondary Battery Functional Layer>

So long as the presently disclosed composition for a non-aqueous secondary battery functional layer contains a core-shell structure particulate polymer including the specific shell portion described above, the presently disclosed composition for a non-aqueous secondary battery functional layer can be produced without any specific limitations by, for example, stirring and mixing the particulate polymer and the previously described binder and other components that are optionally added, in the presence of a dispersion medium such as water. Note that in a case in which a dispersion liquid of a particulate polymer is used in production of the composition for a non-aqueous secondary battery functional layer, liquid content of the dispersion liquid may be used as the dispersion medium of the composition for a non-aqueous secondary battery functional layer.

The stirring can be performed by a known method without any specific limitations. Specifically, the composition for a non-aqueous secondary battery functional layer can be produced in the form of a slurry by mixing the above-described components and the dispersion medium using a typical stirring vessel, ball mill, sand mill, bead mill, pigment disperser, ultrasonic disperser, grinding machine, homogenizer, planetary mixer, FILMIX, or the like. Mixing of the components and the dispersion medium can normally be performed for a period of from 10 minutes to several hours in a temperature range of from room temperature to 80° C.

(Battery Member for Non-Aqueous Secondary Battery)

So long as the presently disclosed battery member (separator or electrode) for a non-aqueous secondary battery includes a non-aqueous secondary battery functional layer that is formed from the composition for a non-aqueous secondary battery functional layer set forth above, the presently disclosed battery member for a non-aqueous secondary battery may include constituent elements other than the non-aqueous secondary battery functional layer without any specific limitations.

<Non-Aqueous Secondary Battery Functional Layer>

The non-aqueous secondary battery functional layer is a layer that is formed from the composition for a non-aqueous secondary battery functional layer set forth above. For example, the non-aqueous secondary battery functional layer can be formed by applying the composition for a non-aqueous secondary battery functional layer set forth above onto the surface of a suitable substrate to form a coating film, and subsequently drying the coating film that is formed. In other words, the non-aqueous secondary battery functional layer is formed of a dried product of the composition for a non-aqueous secondary battery functional layer set forth above, contains the particulate polymer, and optionally contains a binder and other components. Note that in a case in which the polymer A forming the core portion of the particulate polymer or the polymer B forming the shell portion of the particulate polymer includes a cross-linkable monomer unit, the polymer A or polymer B that includes the cross-linkable monomer unit may be cross-linked during drying of the composition for a non-aqueous secondary battery functional layer or during heat treatment or the like that is optionally performed after drying (i.e., the non-aqueous secondary battery functional layer may contain a cross-linked product of the polymer A or the polymer B in the particulate polymer).

The non-aqueous secondary battery functional layer can cause the battery member for a non-aqueous secondary battery that includes the non-aqueous secondary battery functional layer to display excellent blocking resistance and process adhesiveness as a result of being formed using the composition for a non-aqueous secondary battery functional layer set forth above.

Note that the non-aqueous secondary battery functional layer may, without any specific limitations, be used as an adhesive layer that does not contain non-conductive particles or as a porous membrane layer that does contain non-conductive particles, for example.

Moreover, although the particulate polymer is present in a particulate form in the composition for a non-aqueous secondary battery functional layer, the particulate polymer may be in a particulate form or in any other form in the formed functional layer.

<Substrate>

No limitations are placed on the substrate onto which the composition for a non-aqueous secondary battery functional layer is applied. For example, a coating film of the composition for a non-aqueous secondary battery functional layer may be formed on the surface of a releasable substrate, the coating film may be dried to form a non-aqueous secondary battery functional layer, and then the releasable substrate may be peeled from the non-aqueous secondary battery functional layer. The functional layer that is peeled from the releasable substrate in this manner can be used as a free-standing film in formation of the battery member for a secondary battery. Specifically, the functional layer that is peeled from the releasable substrate may be stacked on a separator substrate to form a separator including the functional layer or may be stacked on an electrode substrate to form an electrode including the functional layer.

However, it is preferable that a separator substrate or an electrode substrate is used as the substrate from a viewpoint of raising production efficiency of the battery member for a non-aqueous secondary battery since a step of peeling the functional layer can be omitted. A functional layer provided on a separator substrate or an electrode substrate can, in particular, suitably be used as an adhesive layer for adhering battery members for a non-aqueous secondary battery, such as a separator and an electrode, to one another.

[Separator Substrate]

The separator substrate is not specifically limited and may be a known separator substrate such as an organic separator substrate. The organic separator substrate is a porous member that is made from an organic material. The organic separator substrate may, for example, be a microporous membrane or non-woven fabric containing a polyolefin resin such as polyethylene or polypropylene, or an aromatic polyamide resin, and is preferably a microporous membrane or non-woven fabric made from polyethylene due to the excellent strength thereof. Although the separator substrate may be of any thickness, the thickness thereof is preferably not less than 5 μm and not more than 30 μm, more preferably not less than 5 μm and not more than 20 μm, and even more preferably not less than 5 μm and not more than 18 μm.

A separator substrate thickness of 5 μm or more enables sufficient safety. Moreover, a separator substrate thickness of 30 μm or less can inhibit reduction of ion conductivity and deterioration of secondary battery output characteristics, and can also inhibit increase of heat shrinkage force of the separator substrate and improve heat resistance.

[Electrode Substrate]

The electrode substrate (positive/negative electrode substrate) is not specifically limited and may, for example, be an electrode substrate obtained by forming an electrode mixed material layer on a current collector.

Note that the current collector, an electrode active material (positive/negative electrode active material) and a binder for an electrode mixed material layer (binder for positive/negative electrode mixed material layer) that are contained in the electrode mixed material layer, and the method by which the electrode mixed material layer is formed on the current collector can be known examples thereof such as any of those described in JP 2013-145763 A, for example.

<Formation Method of Non-Aqueous Secondary Battery Functional Layer>

Examples of methods by which the non-aqueous secondary battery functional layer may be formed on a substrate such as the separator substrate or the electrode substrate described above include:

(1) a method in which the composition for a non-aqueous secondary battery functional layer is applied onto the surface of a separator substrate or an electrode substrate (surface at the electrode mixed material layer side in the case of an electrode substrate; same applies below) and is then dried;

(2) a method in which a separator substrate or an electrode substrate is immersed in the composition for a non-aqueous secondary battery functional layer and is then dried; and (3) a method in which the composition for a non-aqueous secondary battery functional layer is applied onto a releasable substrate and is dried to produce a functional layer that is then transferred onto the surface of a separator substrate or an electrode substrate.

Of these methods, method (1) is particularly preferable since it allows simple control of the thickness of the non-aqueous secondary battery functional layer. In more detail, method (1) includes a step of applying the composition for a non-aqueous secondary battery functional layer onto a substrate (application step) and a step of drying the composition for a non-aqueous secondary battery functional layer that has been applied onto the substrate to form a non-aqueous secondary battery functional layer (functional layer formation step).

Note that a non-aqueous secondary battery functional layer may be formed at one side or both sides of a separator substrate or an electrode substrate in accordance with the structure of the secondary battery that is to be produced. For example, in a case in which a separator substrate is used as the substrate, a non-aqueous secondary battery functional layer is preferably formed at both sides of the separator substrate, and in a case in which an electrode substrate is used as the substrate, a non-aqueous secondary battery functional layer is preferably formed at both sides of each of a positive electrode substrate and a negative electrode substrate.

[Application Step]

Examples of methods by which the composition for a non-aqueous secondary battery functional layer can be applied onto the substrate in the application step include, but are not specifically limited to, doctor blading, reverse roll coating, direct roll coating, gravure coating, extrusion coating, and brush coating.

[Functional Layer Formation Step]

The method by which the composition for a non-aqueous secondary battery functional layer on the substrate is dried in the functional layer formation step is not specifically limited and may be a commonly known method. Examples of drying methods that may be used include drying by warm, hot, or low-humidity air, drying in a vacuum, and drying through irradiation with infrared light, electron beams, or the like. Although no specific limitations are placed on the drying conditions, the drying temperature is preferably 40° C. to 150° C., and the drying time is preferably 2 minutes to 30 minutes.

<Thickness of Non-Aqueous Secondary Battery Functional Layer>

The thickness of each non-aqueous secondary battery functional layer formed on the substrate is preferably 0.01 μm or more, more preferably 0.1 μm or more, particularly preferably 0.5 μm or more, and most preferably 1 μm or more, and is preferably 10 μm or less, more preferably 5 μm or less, and particularly preferably 2 μm or less. A non-aqueous secondary battery functional layer thickness of 0.01 μm or more can ensure sufficient strength of the non-aqueous secondary battery functional layer. On the other hand, a non-aqueous secondary battery functional layer thickness of 10 μm or less can ensure ion conductivity of the non-aqueous secondary battery functional layer inside a secondary battery and can improve battery characteristics (output characteristics, etc.) of a secondary battery that includes the non-aqueous secondary battery functional layer.

(Production Method of Laminate for Non-Aqueous Secondary Battery)

A laminate for a non-aqueous secondary battery in which a separator and an electrode are stacked includes the presently disclosed battery member set forth above as at least one of the separator and the electrode. In other words, only one of the separator and the electrode may be the presently disclosed battery member or both of the separator and the electrode may be the presently disclosed battery members. Moreover, only the positive electrode among the electrodes may be the presently disclosed battery member, only the negative electrode among the electrodes may be the presently disclosed battery member, or both the positive and negative electrodes among the electrodes may be the presently disclosed battery members. As a result of the laminate for a non-aqueous secondary battery including the battery member set forth above, the laminate for a non-aqueous secondary battery has a structure in which a separator substrate and an electrode substrate are adhered via a functional layer. The laminate for a non-aqueous secondary battery can be used in a non-aqueous secondary battery as a member including a separator substrate and an electrode substrate that are adhered via a functional layer. The presently disclosed method of producing a laminate for a non-aqueous secondary battery is a method of producing the laminate for a non-aqueous secondary battery set forth above and includes: a stacking step of stacking a separator and an electrode; and an adhering step of pressing the separator substrate and the electrode substrate that have been stacked to adhere the separator substrate and the electrode substrate. Through this method, it is possible to produce, with high productivity, a laminate for a non-aqueous secondary battery including a battery member for a non-aqueous secondary battery that can display a balance of both high blocking resistance and high process adhesiveness and with which a high-performance non-aqueous secondary battery can be obtained.

Note that so long as the laminate for a non-aqueous secondary battery has a separator and an electrode stacked therein and includes the presently disclosed battery member set forth above as at least one of the separator and the electrode, the laminate for a non-aqueous secondary battery may, for example, be a laminate in which a separator that is the presently disclosed battery member and electrodes (positive electrode and negative electrode) that are not the presently disclosed battery member are stacked as one set in an order of negative electrode/separator/positive electrode, or may be a laminate in which a plurality of sets are stacked in this order.

<Battery Members (Separator and Electrode)>

At least one of a separator and an electrode used in the presently disclosed method of producing a laminate for a non-aqueous secondary battery is the presently disclosed battery member. In other words, at least one of the separator and the electrode includes a functional layer formed from the presently disclosed composition for a non-aqueous secondary battery functional layer on the surface of a substrate. Note that the substrate (separator substrate or electrode substrate) can be a substrate such as previously described and the method by which the functional layer is formed on the substrate using the composition for a non-aqueous secondary battery can be a method such as previously described.

<Stacking Step>

In the stacking step, the separator and the electrode are stacked. Moreover, the separator and the electrode are stacked in a state in which the functional layer is interposed between the separator substrate of the separator and the electrode substrate of the electrode. More specifically, the stacking step may involve, for example, stacking a separator including a functional layer at the surface (separator that is the presently disclosed battery member) and an electrode not including a functional layer at the surface (electrode that is not the presently disclosed battery member) such that the functional layer is positioned between the separator substrate and the electrode substrate. Alternatively, the stacking step may involve, for example, stacking an electrode including a functional layer at the surface (electrode that is the presently disclosed battery member) and a separator not including a functional layer at the surface (separator that is not the presently disclosed battery member) such that the functional layer is positioned between the separator substrate and the electrode substrate. In this manner, the separator substrate and the electrode substrate are arranged adjacently with the functional layer interposed in-between. Note that the stacking step may involve stacking an electrode including a functional layer at the surface (electrode that is the presently disclosed battery member) and a separator including a functional layer at the surface (separator that is the presently disclosed battery member). Moreover, as previously described, no specific limitations are placed on the number of separators and electrodes that are stacked in the stacking step. For example, a positive electrode, a separator, and a negative electrode may be stacked in order.

Known methods can be adopted as the method by which an electrode or separator is stacked without any specific limitations.

<Adhering Step>

In the presently disclosed method of producing a laminate for a non-aqueous secondary battery, the separator and the electrode that have been stacked are pressed to adhere the separator and the electrode (adhering step). The pressure during pressing is preferably 0.1 MPa or more, and more preferably 2 MPa or more, and is preferably 30 MPa or less, and more preferably 10 MPa or less. The pressing time is preferably 1 second or more, and more preferably 5 seconds or more, and is preferably 60 minutes or less. Moreover, the separator and the electrode that have been stacked may be heated during pressing. Known methods can be adopted as the method of heating without any specific limitations. The heating temperature is preferably 25° C. or higher, and is preferably 100° C. or lower, and more preferably 90° C. or lower.

(Non-Aqueous Secondary Battery)

The presently disclosed non-aqueous secondary battery is a secondary battery that includes the presently disclosed battery member (positive electrode, negative electrode, or separator) for a non-aqueous secondary battery. More specifically, the presently disclosed non-aqueous secondary battery includes a positive electrode, a negative electrode, a separator, and an electrolyte solution, wherein at least one of the positive electrode, the negative electrode, and the separator is the presently disclosed battery member for a non-aqueous secondary battery. Note that the presently disclosed non-aqueous secondary battery may include the presently disclosed battery member (positive electrode, negative electrode, or separator) for a non-aqueous secondary battery by including a laminate that is produced by the presently disclosed method of producing a laminate for a non-aqueous secondary battery set forth above.

The presently disclosed non-aqueous secondary battery displays excellent characteristics as a result of including the presently disclosed battery member for a non-aqueous secondary battery.

<Positive Electrode, Negative Electrode, and Separator>

At least one of the positive electrode, the negative electrode, and the separator used in the presently disclosed non-aqueous secondary battery includes the non-aqueous secondary battery functional layer set forth above. Specifically, an electrode obtained by providing the non-aqueous secondary battery functional layer set forth above on an electrode substrate that includes an electrode mixed material layer formed on a current collector can be used as a positive electrode or a negative electrode that includes the non-aqueous secondary battery functional layer. Moreover, a separator obtained by providing the non-aqueous secondary battery functional layer set forth above on a separator substrate can be used as a separator that includes the non-aqueous secondary battery functional layer. The electrode substrate and the separator substrate can be any of the examples previously described in the "Battery member for non-aqueous secondary battery" section.

Moreover, an electrode composed of an electrode substrate such as previously described or a separator composed of a separator substrate such as previously described can be used without any specific limitations as a positive electrode, negative electrode, or separator that does not include the non-aqueous secondary battery functional layer.

<Electrolyte Solution>

The electrolyte solution is normally an organic electrolyte solution obtained by dissolving a supporting electrolyte in an organic solvent. The supporting electrolyte may, for example, be a lithium salt in the case of a lithium ion secondary battery. Examples of lithium salts that can be used include $LiPF_6$, $LiAsF_6$, $LiBF_4$, $LiSbF_6$, $LiAlCl_4$, $LiClO_4$, $CF_3SO_3Li$, $C_4F_9SO_3Li$, $CF_3COOLi$, $(CF_3CO)_2NLi$, $(CF_3SO_2)_2NLi$, and $(C_2F_5SO_2)_2NLi$. Of these lithium salts, $LiPF_6$, $LiClO_4$, and $CF_3SO_3Li$ are preferable as they readily dissolve in solvents and exhibit a high degree of dissociation. One electrolyte may be used individually, or two or more electrolytes may be used in combination. In general, lithium ion conductivity tends to increase when a supporting electrolyte having a high degree of dissociation is used. Therefore, lithium ion conductivity can be adjusted through the type of supporting electrolyte that is used.

The organic solvent used in the electrolyte solution is not specifically limited so long as the supporting electrolyte can dissolve therein. Suitable examples of organic solvents in the case of a lithium ion secondary battery include carbonates such as dimethyl carbonate (DMC), ethylene carbonate (EC), diethyl carbonate (DEC), propylene carbonate (PC), butylene carbonate (BC), ethyl methyl carbonate (EMC), and vinylene carbonate (VC); esters such as γ-butyrolactone and methyl formate; ethers such as 1,2-dimethoxyethane and tetrahydrofuran; and sulfur-containing compounds such as sulfolane and dimethyl sulfoxide. Furthermore, a mixture of these solvents may be used. Of these solvents, carbonates are preferable due to having high permittivity and a wide stable potential region. In general, lithium ion conductivity tends to increase when a solvent having a low viscosity is used. Therefore, lithium ion conductivity can be adjusted through the type of solvent that is used.

The concentration of the electrolyte in the electrolyte solution may be adjusted as appropriate. Furthermore, known additives may be added to the electrolyte solution.

<Production Method of Non-Aqueous Secondary Battery>

The presently disclosed non-aqueous secondary battery set forth above can be produced by, for example, overlapping the positive electrode and the negative electrode with the separator in-between, performing rolling, folding, or the like of the resultant laminate as necessary to place the laminate in a battery container, injecting the electrolyte solution into the battery container, and sealing the battery container. Note that at least one battery member for a non-aqueous secondary battery among the positive electrode, the negative electrode, and the separator is a battery member for a non-aqueous secondary battery that is equipped with a non-aqueous secondary battery functional layer. Also note that a laminate that is produced by the presently disclosed method of producing a laminate for a non-aqueous secondary battery can be used as an electrode and a separator. In order to prevent pressure increase inside the battery and occurrence of overcharging or overdischarging, an expanded metal; an overcurrent preventing device such as a fuse or a PTC device; or a lead plate may be provided in the battery container as necessary. The shape of the battery may, for example, be a coin type, a button type, a sheet type, a cylinder type, a prismatic type, or a flat type.

EXAMPLES

The following provides a more specific description of the present disclosure based on examples. However, the present disclosure is not limited to the following examples. In the following description, "%" and "parts" used in expressing quantities are by mass, unless otherwise specified.

Moreover, in the case of a polymer that is produced through copolymerization of a plurality of types of monomers, the proportion in the polymer constituted by a monomer unit that is formed through polymerization of a given monomer is normally, unless otherwise specified, the same as the ratio (charging ratio) of the given monomer among all monomers used in polymerization of the polymer.

Furthermore, in the case of a particulate polymer having a core-shell structure, the proportion constituted by the core portion (core proportion) among the total of the core portion and the shell portion is, unless otherwise specified, the same as the ratio (charging ratio) of the mass of monomers used in production of a polymer of the core portion among the total mass of monomers used in production of the polymer of the core portion and monomers used in production of a polymer of the shell portion.

In the examples and comparative examples, the following methods were used to measure and evaluate "the content (mol %) of a sulfo group-containing monomer unit in a shell portion", "the glass-transition temperatures (Tg) of polymers of a core portion and a shell portion of a particulate polymer and of a binder", "the degree of swelling in electrolyte solution of a polymer A forming a core portion", "the volume-average particle diameter of a particulate polymer", "the dusting resistance of a functional layer", "the process adhesiveness and blocking resistance of a battery member including a functional layer", and "the rate characteristics (low-temperature output characteristics) of a non-aqueous secondary battery including a battery member".

<Content (mol %) of Sulfo Group-Containing Monomer Unit in Shell Portion>

A known sulfo group-containing polymer was obtained and then a ratio was determined of maximum light absorbance of a peak having a local maximum at a wavenumber of 2800 cm$^{-1}$ to 3000 cm$^{-1}$ in infrared spectroscopy and maximum light absorbance of a peak having a local maximum at a wavenumber of 1380 cm$^{-1}$ to 1500 cm$^{-1}$ in infrared spectroscopy. The obtained value was used to prepare a calibration curve through calculation by multiple regression analysis or principal component regression analysis. A polymer serving as a measurement sample was produced under the same polymerization conditions as for a shell portion, the ratio of maximum light absorbance of a peak having a local maximum at a wavenumber of 2800 cm$^{-1}$ to 3000 cm$^{-1}$ and maximum light absorbance of a peak having a local maximum at a wavenumber of 1380 cm$^{-1}$ to 1500 cm$^{-1}$ was determined in the same manner, and the sulfo group content was determined from the calibration curve.

<Glass-Transition Temperature (Tg)>

Monomers, various additives, and so forth used in formation of a core portion of a particulate polymer, a shell portion of a particulate polymer, or a binder were used to produce a water dispersion containing a polymer (polymer of core portion, polymer of shell portion, or binder) to be used as a measurement sample under the same polymerization conditions as for the core portion, shell portion, or binder. The produced water dispersion was taken to be a measurement sample.

After measuring 10 mg of the measurement sample into an aluminum pan, a differential scanning calorimeter (EXSTAR DSC6220 produced by SII NanoTechnology Inc.) was used to measure the measurement sample under conditions prescribed by JIS Z 8703 in a measurement temperature range of −100° C. to 500° C. and at a heating rate of 10° C./min to obtain a differential scanning calorimetry (DSC) curve. Note that an empty aluminum pan was used as a reference. In the heating process, an intersection point of a baseline directly before a heat absorption peak on the DSC curve at which a derivative signal (DDSC) reached 0.05 mW/min/mg or more and a tangent to the DSC curve at a first inflection point to appear after the heat absorption peak was determined as the glass-transition temperature (° C.).

<Degree of Swelling in Electrolyte Solution of Polymer A Forming Core Portion>

A water dispersion containing a polymer A forming a core portion was produced in the same way as a water dispersion containing the polymer A forming the core portion was produced in each example or comparative example. The water dispersion was loaded into a petri dish made from polytetrafluoroethylene. The water dispersion in the petri dish was dried at a temperature of 25° C. for 48 hours to obtain a powdered sample. Approximately 0.2 g of the sample was pressed for 2 minutes at a temperature of 200° C. and a pressure of 5 MPa to obtain a test specimen. The weight of the obtained test specimen was measured and was taken to be W0.

Next, the obtained test specimen was immersed in electrolyte solution having a temperature of 60° C. for 72 hours. The electrolyte solution was a solution containing LiPF$_6$ of 1 M in concentration as a supporting electrolyte in a mixed solvent of ethylene carbonate (EC), diethyl carbonate (DEC), and vinylene carbonate (VC) (volume mixing ratio: EC/DEC/VC=68.5/30/1.5 (volume ratio)).

After this immersion, the test specimen was removed from the electrolyte solution, and electrolyte solution on the surface of the test specimen was wiped off. The weight of the test specimen after immersion was measured and was taken to be W1. The measured weights W0 and W1 were used to calculate the degree of swelling in electrolyte solution S (mass %) as S=W1/W0×100.

<Volume-Average Particle Diameter>

The volume-average particle diameter of a particulate polymer was measured by laser diffraction. Specifically, a produced water dispersion containing the particulate polymer (adjusted to a solid content concentration of 0.1 mass %) was used as a sample. The volume-average particle diameter was taken to be the particle diameter D50 at which, in a particle diameter distribution (volume basis) measured using a laser diffraction particle diameter distribution analyzer (produced by Beckman Coulter, Inc.; product name: LS-230), cumulative volume calculated from the small diameter end of the distribution reached 50%.

<Dusting Resistance>

Dusting resistance (i.e., adhesiveness between a substrate (separator or positive electrode) and a non-aqueous secondary battery functional layer (adhesive layer)) was measured and evaluated as peel strength as described below.

Specifically, a produced separator equipped with a non-aqueous secondary battery functional layer (adhesive layer) was cut to a rectangular shape of 100 mm in length and 10 mm in width to obtain a test specimen. The test specimen was placed with the surface of the non-aqueous secondary battery functional layer (adhesive layer) facing downward, and cellophane tape (tape prescribed by JIS Z1522) was affixed to the surface of the non-aqueous secondary battery functional layer (adhesive layer). Note that the cellophane tape was secured to a horizontal test stage in advance. The stress when the separator was peeled off by pulling one end of the separator vertically upward at a pulling speed of 50 mm/min was measured. This measurement was made a total of 3 times.

Separately to the above, a produced positive electrode equipped with a non-aqueous secondary battery functional layer (adhesive layer) was cut to a rectangular shape of 100 mm in length and 10 mm in width to obtain a test specimen and then stress measurement was performed a total of 3 times in the same manner as for the separator equipped with a non-aqueous secondary battery functional layer (adhesive layer).

An average value of the total of 6 stress measurements made using the separator equipped with a non-aqueous secondary battery functional layer (adhesive layer) and the positive electrode equipped with a non-aqueous secondary battery functional layer (adhesive layer) was calculated as first peel strength (N/m), and then dusting resistance was evaluated by the following standard. A larger first peel strength indicates better adhesiveness between a substrate and a non-aqueous secondary battery functional layer (adhesive layer) and better dusting resistance. The results are shown in Table 2.
A: First peel strength of 40 N/m or more
B: First peel strength of less than 40 N/m
C: Dusting of adhesive layer (detachment of adhesive particles) occurs <Process Adhesiveness>

A produced positive electrode and a produced separator (including a functional layer at both sides) were each cut to 50 mm in length and 10 mm in width.

The cut positive electrode and separator were then overlapped and stacked. The resultant laminate was pressed at a pressing rate of 30 m/min by roll pressing with a temperature of 70° C. and a load of 10 kN/m to obtain a test specimen.

The test specimen was placed with the surface at the current collector side of the positive electrode facing downward, and cellophane tape (tape prescribed by JIS Z1522) was affixed to the surface at the current collector side of the positive electrode. Note that the cellophane tape was secured to a horizontal test stage in advance. The stress when the separator was peeled off by pulling one end of the separator vertically upward at a pulling speed of 50 mm/min was measured. This measurement was made a total of 3 times.

Separately to the above, a produced negative electrode and a produced separator were each cut to 50 mm in length and 10 mm in width. A test specimen was obtained and the stress was measured a total of 3 times in the same manner as when the positive electrode was used.

An average value of the total of 6 stress measurements made using the positive electrode and the negative electrode was calculated as first peel strength (N/m) and was evaluated by the following standard as process adhesiveness of an electrode and a separator via a functional layer. A larger first peel strength indicates better process adhesiveness.

A: First peel strength of 5.0 N/m or more
B: First peel strength of not less than 3.0 N/m and less than 5.0 N/m
C: First peel strength of not less than 1.0 N/m and less than 3.0 N/m
D: First peel strength of less than 1.0 N/m <Blocking Resistance>

A produced separator (including a functional layer at both sides) was cut out as a 5 cm×5 cm square piece and a 4 cm×4 cm square piece. A laminate obtained by overlapping the cut-out 5 cm square piece and 4 cm square piece (non-pressed sample) was placed under pressure at 25° C. and 8 MPa to obtain a pressed test specimen (pressed sample). The pressed test specimen that was obtained was left for 24 hours. One of the overlapped separator square pieces in the test specimen that had been left for 24 hours was fixed in place and the other of the square pieces was pulled with a force of 10 N/m to inspect whether or not the square pieces could be peeled apart (i.e., to inspect the state of blocking). An evaluation was made by the following standard.
A: No blocking of separators
B: Blocking of separators occurs but peeling is possible
C: Blocking of separators occurs and peeling is not possible <Rate Characteristics (Low-Temperature Output Characteristics)>

A lithium ion secondary battery (40 mAh stacked laminate cell) produced as a non-aqueous secondary battery was left for 24 hours in a 25° C. environment. The lithium ion secondary battery was subsequently charged for 5 hours at a charge rate of 0.1 C in a 25° C. environment, and the voltage measured after charging was taken to be V0. Next, the lithium ion secondary battery was discharged at a discharge rate of 1 C in a −10° C. environment and the voltage measured at 15 seconds after the start of discharge was taken to be V1.

The voltage change $\Delta V$ was calculated as $\Delta V = V0 - V1$, and rate characteristics (low-temperature output characteristics) of the non-aqueous secondary battery were evaluated by the following standard. A smaller value for the voltage change $\Delta V$ indicates better rate characteristics (low-temperature output characteristics).
A: Voltage change $\Delta V$ of less than 300 mV
B: Voltage change $\Delta V$ of not less than 300 mV and less than 400 mV
C: Voltage change $\Delta V$ of not less than 400 mV and less than 500 mV
D: Voltage change $\Delta V$ of 500 mV or more Example 1

<Production of Particulate Polymer>

In core portion formation, 28 parts by mass of butyl acrylate (BA) monomer, 14 parts by mass of methyl methacrylate (MMA) monomer, 24.5 parts by mass of styrene (ST) monomer, 2.8 parts by mass of methacrylic acid (MAA) monomer, 0.7 parts by mass of ethylene glycol dimethacrylate (EDMA) monomer, 1 part by mass of sodium dodecylbenzenesulfonate as an emulsifier, 150 parts by mass of deionized water, and 0.5 parts by mass of potassium persulfate as a polymerization initiator were loaded into a 5 MPa pressure vessel equipped with a stirrer, were sufficiently stirred, and were then heated to 60° C. to initiate polymerization. Polymerization was continued until the polymerization conversion rate reached 96% to yield a water dispersion containing a particulate polymer A forming a core portion. Next, at the point at which the polymerization conversion rate reached 96%, 27.1 parts by mass of styrene (ST), 2.6 parts by mass of lithium styrene sulfonate (LiSS), and 0.2 parts by mass of methacrylic acid (MAA) were continuously added for shell portion formation (added such that the molar ratio of monomer units forming the shell portion (styrene (ST):lithium styrene sulfonate (LiSS):methacrylic acid (MAA)) was 94:5:1), and polymerization was continued under heating to 70° C. At the point at which the conversion rate reached 96%, cooling was performed to terminate the reaction and yield a water dispersion containing a particulate polymer.

The degree of swelling in electrolyte solution of the polymer A forming the core portion and the volume-average particle diameter of the obtained particulate polymer were measured. In addition, the glass-transition temperatures of polymers of the core portion and the shell portion were measured. The results are shown in Table 2.

<Production of Binder>

A mixture of 33 parts by mass of 1,3-butadiene as an aliphatic conjugated diene monomer, 62 parts by mass of styrene as an aromatic vinyl monomer, 4 parts by mass of itaconic acid as a carboxy group-containing monomer, 0.3 parts by mass of tert-dodecyl mercaptan as a chain transfer agent, and 0.3 parts by mass of sodium lauryl sulfate as an emulsifier was prepared in a vessel A. Addition of the mixture from the vessel A to a pressure vessel B was initiated, and, simultaneously thereto, addition of 1 part by mass of potassium persulfate to the pressure vessel B as a polymerization initiator was initiated to initiate polymerization. A reaction temperature of 75° C. was maintained.

After 4 hours from the start of polymerization (after 70% of the mixture had been added into the pressure vessel B), 1 part by mass of 2-hydroxyethyl acrylate was added into the pressure vessel B as a hydroxy group-containing monomer over 1 hour and 30 minutes.

Addition of the total amount of the above-described monomers was completed 5 hours and 30 minutes after the start of polymerization. Heating was subsequently performed to 85° C. and a reaction was carried out for 6 hours.

The reaction was terminated by cooling at the point at which the polymerization conversion rate reached 97% to yield a mixture containing a binder. The mixture containing the binder was adjusted to pH 8 through addition of 5% sodium hydroxide aqueous solution. Unreacted monomer was subsequently removed through thermal-vacuum distillation. Cooling was then performed to obtain a water dispersion (solid content concentration: 40%) containing the binder.

The measured glass-transition temperature of the obtained binder was 5° C.

<Production of Composition for Non-Aqueous Secondary Battery Functional Layer>

A mixture was obtained by mixing 10 parts by mass in terms of solid content of the binder and 100 parts by mass in terms of solid content of the particulate polymer in a stirring vessel.

The obtained mixture was diluted using deionized water to obtain a composition for a non-aqueous secondary battery functional layer (solid content concentration: 10%) in the form of a slurry.

<Production of Separator Including Non-Aqueous Secondary Battery Functional Layer (Adhesive Layer) at Both Sides>

A separator substrate made from polypropylene (produced by Celgard, LLC.; product name: Celgard 2500) was prepared. The composition for a non-aqueous secondary battery functional layer obtained as described above was applied onto a surface of the prepared separator substrate and was dried at a temperature of 50° C. for 3 minutes. The other surface of the separator substrate was also subjected to the same operations to obtain a separator including a non-aqueous secondary battery functional layer (adhesive layer) at both sides (thickness of each non-aqueous secondary battery functional layer (adhesive layer): 1 μm).

Dusting resistance of the obtained non-aqueous secondary battery functional layer (adhesive layer) and process adhesiveness and blocking resistance of the obtained separator were evaluated. The results are shown in Table 2. Note that a negative electrode and a positive electrode produced as described below were used in evaluation of process adhesiveness.

<Production of Negative Electrode>

A 5 MPa pressure vessel equipped with a stirrer was charged with 33 parts of 1,3-butadiene, 3.5 parts of itaconic acid, and 63.5 parts of styrene as monomers, 0.4 parts of sodium dodecylbenzenesulfonate as an emulsifier, 150 parts of deionized water, and 0.5 parts of potassium persulfate as a polymerization initiator. These materials were sufficiently stirred and were then heated to 50° C. to initiate polymerization. The polymerization reaction was terminated by cooling at the point at which the polymerization conversion rate reached 96% to yield a mixture containing a particulate binder (styrene-butadiene copolymer). The mixture was adjusted to pH 8 through addition of 5% sodium hydroxide aqueous solution and was then subjected to thermal-vacuum distillation to remove unreacted monomer. Thereafter, the mixture was cooled to 30° C. or lower to obtain a water dispersion containing a binder for a negative electrode.

A mixture of 100 parts of artificial graphite (average particle diameter: 15.6 μm) and 1 part in terms of solid content of a 2% aqueous solution of a sodium salt of carboxymethyl cellulose (produced by Nippon Paper Industries Co., Ltd.; product name: MAC350HC) as a thickener was adjusted to a solid content concentration of 68% with deionized water and was then mixed at 25° C. for 60 minutes. The solid content concentration was then adjusted to 62% with deionized water, and then a further 15 minutes of mixing was performed at 25° C. to obtain a mixed liquid. Deionized water and 1.5 parts in terms of solid content of the water dispersion containing the binder for a negative electrode described above were added to the obtained mixed liquid, the final solid content concentration was adjusted to 52%, and a further 10 minutes of mixing was performed. The resultant mixed liquid was subjected to a defoaming process under reduced pressure to yield a slurry composition for a negative electrode having good fluidity.

The slurry composition for a non-aqueous secondary battery negative electrode that was obtained as described above was applied onto copper foil (thickness: 20 μm) serving as a current collector using a comma coater such as to have a thickness after drying of approximately 150 μm. The slurry composition was dried by conveying the coated copper foil inside a 60° C. oven for 2 minutes at a speed of 0.5 m/min. Thereafter, 2 minutes of heat treatment was performed at 120° C. to obtain a pre-pressing negative electrode web. The pre-pressing negative electrode web was rolled by roll pressing to obtain a post-pressing negative electrode (negative electrode mixed material layer thickness: 80 μm).

Note that a single-sided negative electrode was produced by applying the slurry composition at one side and a double-sided negative electrode was produced by applying the slurry composition at both sides. The single-sided negative electrode was used to evaluate process adhesiveness and the double-sided negative electrode was used to produce the subsequently described non-aqueous secondary battery.
<Formation of Positive Electrode>

A mixed liquid adjusted to a total solid content concentration of 70% was obtained by mixing 100 parts of $LiCoO_2$ (volume-average particle diameter: 12 μm) as a positive electrode active material, 2 parts of acetylene black (produced by Denka Company Limited; product name: HS-100) as a conductive material, and 2 parts in terms of solid content of polyvinylidene fluoride (produced by Kureha Corporation; product name: #7208) as a binder for a positive electrode with N-methylpyrrolidone as a solvent. The obtained mixed liquid was mixed using a planetary mixer to obtain a slurry composition for a non-aqueous secondary battery positive electrode.

The slurry composition for a non-aqueous secondary battery positive electrode that was obtained as described above was applied onto aluminum foil (thickness: 20 μm) serving as a current collector using a comma coater such as to have a thickness after drying of approximately 150 μm. The slurry composition was dried by conveying the aluminum foil inside a 60° C. oven for 2 minutes at a speed of 0.5 m/min. Thereafter, 2 minutes of heat treatment was performed at 120° C. to obtain a pre-pressing positive electrode web. The pre-pressing positive electrode web was rolled by roll pressing to obtain a post-pressing positive electrode (positive electrode mixed material layer thickness: 80 μm).

Note that a single-sided positive electrode was produced by applying the slurry composition at one side and a double-sided positive electrode was produced by applying the slurry composition at both sides. The single-sided positive electrode was used to evaluate process adhesiveness and the double-sided positive electrode was used to produce the subsequently described non-aqueous secondary battery.
<Production of Non-Aqueous Secondary Battery>

The post-pressing double-sided positive electrode obtained as described above was cut out as 10 pieces of 5 cm×5 cm. The separator obtained as described above (including a functional layer at both sides) was cut out as 20 pieces of 5.5 cm×5.5 cm. The post-pressing double-sided negative electrode produced as described above was cut out as 11 pieces of 5.2 cm×5.2 cm. These pieces were stacked in an order of negative electrode/separator/positive electrode and were pressed for 5 seconds at 90° C. and 2 MPa to obtain preliminary laminates. The obtained preliminary laminates were then further stacked in an order of preliminary laminate/separator/preliminary laminate for 10 sets and were pressed for 5 seconds at 90° C. and 2 MPa to obtain a laminate (preliminary laminate 1/separator/preliminary laminate 2/separator/preliminary laminate 3/separator/preliminary laminate 4/separator/preliminary laminate 5/separator/preliminary laminate 6/separator/preliminary laminate 7/separator/preliminary laminate 8/separator/preliminary laminate 9/separator/preliminary laminate 10).

Next, the laminate was enclosed in an aluminum packing case serving as a battery case, and electrolyte solution was injected such that no air remained. The electrolyte solution was a solution containing $LiPF_6$ of 1 M in concentration as a supporting electrolyte in a mixed solvent of ethylene carbonate (EC), diethyl carbonate (DEC), and vinylene carbonate (VC) (volume mixing ratio: EC/DEC/VC=68.5/30/1.5 (volume ratio)). An opening of the aluminum packing case was heat sealed at 150° C. to seal closed the aluminum packing case and thereby produce a stacked lithium ion secondary battery having a capacity of 800 mAh. Rate characteristics (low-temperature output characteristics) were evaluated for the stacked lithium ion secondary battery that was obtained. The results are shown in Table 2. Good operation of the produced lithium ion secondary battery was confirmed.

Examples 2 to 4, 9, and 10, and Comparative Examples 1 and 2

A particulate polymer, a binder, a composition for a non-aqueous secondary battery functional layer, a separator, a negative electrode, a positive electrode, and a non-aqueous secondary battery were produced in the same way as in Example 1 with the exception that in production of the particulate polymer, the types and proportions of monomers of the polymer B used for shell portion formation were changed as shown in Table 1. The obtained particulate polymer had a core-shell structure in which the outer surface of a core portion was partially covered by a shell portion. Measurements and evaluations were conducted in the same way as in Example 1. The results are shown in Table 2.

Example 5

A particulate polymer, a binder, a composition for a non-aqueous secondary battery functional layer, a separator, a negative electrode, a positive electrode, and a non-aqueous secondary battery were produced in the same way as in Example 1 with the exception that instead of obtaining a particulate polymer having a volume-average particulate diameter of 0.5 μm in Example 1, a particulate polymer having a volume-average particle diameter of 0.15 μm was obtained. The obtained particulate polymer had a core-shell structure in which the outer surface of a core portion was partially covered by a shell portion. Measurements and evaluations were conducted in the same way as in Example 1. The results are shown in Table 2.

Example 6

A particulate polymer, a binder, a composition for a non-aqueous secondary battery functional layer, a separator, a negative electrode, a positive electrode, and a non-aqueous secondary battery were produced in the same way as in Example 1 with the exception that instead of obtaining a particulate polymer having a volume-average particulate diameter of 0.5 μm in Example 1, a particulate polymer having a volume-average particle diameter of 1 was obtained. The obtained particulate polymer had a core-shell structure in which the outer surface of a core portion was partially covered by a shell portion. Measurements and evaluations were conducted in the same way as in Example 1. The results are shown in Table 2.

Examples 7 and 8

A particulate polymer, a binder, a composition for a non-aqueous secondary battery functional layer, a separator, a negative electrode, a positive electrode, and a non-aqueous secondary battery were produced in the same way as in Example 1 with the exception that the amount of the binder (10 parts by mass) per 100 parts by mass of the particulate polymer in production of the composition for a functional layer was changed as shown in Table 2 (Example 7: 5 parts by mass; Example 8: 30 parts by mass). Measurements and evaluations were conducted in the same way as in Example 1. The results are shown in Table 2.

Example 11

A particulate polymer, a binder, a composition for a non-aqueous secondary battery functional layer, a separator, a negative electrode, a positive electrode, and a non-aqueous secondary battery were produced in the same way as in Example 1 with the exception that in production of the particulate polymer, the types and proportions of monomers of the polymer A used for core portion formation were changed as shown in Table 1. The obtained particulate polymer had a core-shell structure in which the outer surface of a core portion was partially covered by a shell portion. Measurements and evaluations were conducted in the same way as in Example 1. The results are shown in Table 2.

Comparative Example 3

A particulate polymer, a binder, a composition for a non-aqueous secondary battery functional layer, a separator, a negative electrode, a positive electrode, and a non-aqueous secondary battery were produced in the same way as in Example 1 with the exception that instead of using a particulate polymer having a core-shell structure in Example 1, a particulate polymer that did not have a core-shell structure (non-core-shell structure particulate polymer) was used. Measurements and evaluations were conducted in the same way as in Example 1. The results are shown in Table 2.
<Production of Non-Core-Shell Structure Particulate Polymer>

A 5 MPa pressure vessel equipped with a stirrer was charged with 90.4 parts by mass of styrene (ST), 8.8 parts by mass of lithium styrene sulfonate (LiSS), and 0.8 parts by mass of methacrylic acid (MAA) (set such that the molar ratio of monomer units (styrene (ST):lithium styrene sulfonate (LiSS):methacrylic acid (MAA)) was 94:5:1). These materials were heated to 70° C. to initiate polymerization. Polymerization was continued until the polymerization conversion rate reached 96% to yield a water dispersion containing a non-core-shell structure particulate polymer.

Comparative Example 4

An organic separator equipped with a porous membrane and a secondary battery were obtained by performing operations in the same way as in Example 1 of WO2012/046843A1 with the exception that a porous membrane slurry was produced using non-conductive organic particles described in Example 6 of WO2012/043812A1 instead of non-conductive organic particles obtained by steps (1) to (3) in Example 1 of WO2012/046843A1. "Dusting resistance", "process adhesiveness", "blocking resistance", and "rate characteristics (low-temperature output characteristics)" were evaluated in the same way as in Example 1. The results are shown in Table 2.

In Tables 1 and 2, shown below:
"BA" indicates butyl acrylate unit;
"MMA" indicates methyl methacrylate unit;
"2EHA" indicates 2-ethylhexyl acrylate unit;
"ST" indicates styrene unit;
"MAA" indicates methacrylic acid unit;
"EDMA" indicates ethylene glycol dimethacrylate unit;
"LiSS" indicates lithium styrene sulfonate unit;
"AMPS" indicates 2-acrylamidomethylpropane sulfonic acid unit;
"AN" indicates acrylonitrile unit;
"BD" indicates 1,3-butadiene;
"IA" indicates itaconic acid unit; and
"HEA" indicates 2-hydroxyethyl acrylate unit.

TABLE 1

|  |  |  |  | Example 1 | Example 2 | Example 3 | Example 4 | Example 5 | Example 6 | Example 7 | Example 8 |
|---|---|---|---|---|---|---|---|---|---|---|---|
| Particulate polymer | Chemical composition of polymer A of core portion [parts by mass] | (Meth)acrylic acid ester monomer unit | BA | 40 | 40 | 40 | 40 | 40 | 40 | 40 | 40 |
|  |  |  | MMA | 20 | 20 | 20 | 20 | 20 | 20 | 20 | 20 |
|  |  |  | 2EHA | — | — | — | — | — | — | — | — |
|  |  | Aromatic vinyl monomer unit | ST | 35 | 35 | 35 | 35 | 35 | 35 | 35 | 35 |
|  |  | Acid group-containing monomer unit | MAA | 4 | 4 | 4 | 4 | 4 | 4 | 4 | 4 |
|  |  | Cross-linkable monomer unit | EDMA | 1 | 1 | 1 | 1 | 1 | 1 | 1 | 1 |
|  | Chemical composition of polymer B of shell portion [mol %] | Aromatic vinyl monomer unit | ST | 94 | 74 | 97.5 | 94 | 94 | 94 | 94 | 94 |
|  |  | Sulfo group-containing monomer unit | LiSS | 5 | 25 | 1.5 | — | 5 | 5 | 5 | 5 |
|  |  |  | AMPS | — | — | — | 5 | — | — | — | — |
|  |  | (Meth)acrylic acid ester monomer unit | BA | — | — | — | — | — | — | — | — |
|  |  | (Meth)acrylic acid monomer unit | MAA | 1 | 1 | 1 | 1 | 1 | 1 | 1 | 1 |
|  |  | (Meth)acrylonitrile monomer unit | AN | — | — | — | — | — | — | — | — |
| Binder | Chemical composition [parts by mass] | Aliphatic conjugated diene monomer unit | BD | 33 | 33 | 33 | 33 | 33 | 33 | 33 | 33 |
|  |  | Aromatic vinyl monomer unit | ST | 62 | 62 | 62 | 62 | 62 | 62 | 62 | 62 |
|  |  | Carboxy group-containing monomer unit | IA | 4 | 4 | 4 | 4 | 4 | 4 | 4 | 4 |
|  |  | Hydroxy group-containing monomer unit | HEA | 1 | 1 | 1 | 1 | 1 | 1 | 1 | 1 |

TABLE 1-continued

|  |  |  |  | Example 9 | Example 10 | Example 11 | Comparative Example 1 | Comparative Example 2 | Comparative Example 3 | Comparative Example 4 |
|---|---|---|---|---|---|---|---|---|---|---|
| Particulate polymer | Chemical composition of polymer A of core portion [parts by mass] | (Meth)acrylic acid ester monomer unit | BA | 40 | 40 | — | 40 | 40 | No polymer A | Non-conductive organic particles described in Example 6 of WO2012/043812 |
|  |  |  | MMA | 20 | 20 | — | 20 | 20 |  |  |
|  |  |  | 2EHA | — | — | 40 | — | — |  |  |
|  |  | Aromatic vinyl monomer unit | ST | 35 | 35 | 55 | 35 | 35 |  |  |
|  |  | Acid group-containing monomer unit | MAA | 4 | 4 | 4 | 4 | 4 |  |  |
|  |  | Cross-linkable monomer unit | EDMA | 1 | 1 | 1 | 1 | 1 |  |  |
|  | Chemical composition of polymer B of shell portion [mol %] | Aromatic vinyl monomer unit | ST | 89 | — | 94 | 99 | 64 | 94 |  |
|  |  | Sulfo group-containing monomer unit | LiSS | 5 | 5 | 5 | — | 35 | 5 |  |
|  |  |  | AMPS | — | — | — | — | — | — |  |
|  |  | (Meth)acrylic acid ester monomer unit | BA | 5 | — | — | — | — | — |  |
|  |  | (Meth)acrylic acid monomer unit | MAA | 1 | 1 | 1 | 1 | 1 | 1 |  |
|  |  | (Meth)acrylonitrile monomer unit | AN | — | 94 | — | — | — | — |  |
| Binder | Chemical composition [parts by mass] | Aliphatic conjugated diene monomer unit | BD | 33 | 33 | 33 | 33 | 33 | 33 | Binder described in Example 1 of WO2012/046843 |
|  |  | Aromatic vinyl monomer unit | ST | 62 | 62 | 62 | 62 | 62 | 62 |  |
|  |  | Carboxy group-containing monomer unit | IA | 4 | 4 | 4 | 4 | 4 | 4 |  |
|  |  | Hydroxy group-containing monomer unit | HEA | 1 | 1 | 1 | 1 | 1 | 1 |  |

TABLE 2

|  |  | Example 1 | Example 2 | Example 3 | Example 4 | Example 5 | Example 6 | Example 7 | Example 8 |
|---|---|---|---|---|---|---|---|---|---|
| Particulate polymer | Structure | Core-shell | Core-shell | Core-shell | Core-shell | Core-shell | Core-shell | Core-shell | Core-shell |
|  | Glass-transition temperature of core portion [° C.] | 50 | 50 | 50 | 50 | 50 | 50 | 50 | 50 |
|  | Degree of swelling in electrolyte solution of core portion [mass %] | 300 | 300 | 300 | 300 | 300 | 300 | 300 | 300 |
|  | Glass-transition temperature of shell portion [° C.] | 102 | 102 | 102 | 102 | 102 | 102 | 102 | 102 |
|  | Gass-transition temperature (non-core-shell [° C.] | — | — | — | — | — | — | — | — |
|  | Proportion constituted by core portion among total of core portion and shell portion [mass %] | 70 | 70 | 70 | 70 | 70 | 70 | 70 | 70 |
|  | Volume-average particle diameter [μm] | 0.5 | 0.5 | 0.5 | 0.5 | 0.15 | 1 | 0.5 | 0.5 |
| Binder | Glass-transition temperature [° C.] | 2 | 2 | 2 | 2 | 2 | 2 | 2 | 2 |
|  | Amount per 100 parts by mass of particulate polymer [parts by mass] | 10 | 10 | 10 | 10 | 10 | 10 | 5 | 30 |
|  | Dusting resistance | A | B | A | A | A | A | B | A |
|  | Process adhesiveness | A | A | B | A | A | B | B | A |
|  | Blocking resistance | A | B | A | A | A | A | A | B |
|  | Rate characteristics (low-temperature output characteristics) | A | A | B | A | B | A | A | B |

TABLE 2-continued

|  |  | Example 9 | Example 10 | Example 11 | Comparative Example 1 | Comparative Example 2 | Comparative Example 3 | Comparative Example 4 |
|---|---|---|---|---|---|---|---|---|
| Particulate polymer | Structure | Core-shell | Core-shell | Core-shell | Core-shell | Core-shell | Non-core-shell | Non-conductive organic particles described in Example 6 of WO2012/ 043812 |
|  | Glass-transition temperature of core portion [° C.] | 50 | 50 | 50 | 50 | 50 | — |  |
|  | Degree of swelling in electrolyte solution of core portion [mass %] | 300 | 300 | 300 | 300 | 300 | 300 |  |
|  | Glass-transition temperature of shell portion [° C.] | 80 | 120 | 102 | 102 | 102 | — |  |
|  | Gass-transition temperature (non-core-shell [° C.] | — | — | — | — | — | 50 |  |
|  | Proportion constituted by core portion among total of core portion and shell portion [mass %] | 70 | 70 | 70 | 70 | 70 | — |  |
|  | Volume-average particle diameter [μm] | 0.5 | 0.5 | 0.5 | 0.5 | 0.5 | 0.5 |  |
| Binder | Glass-transition temperature [° C.] | 2 | 2 | 2 | 2 | 2 | 2 | Binder described in Example 1 of WO2012/ 046843 |
|  | Amount per 100 parts by mass of particulate polymer [parts by mass] | 10 | 10 | 10 | 10 | 10 | 10 |  |
|  | Dusting resistance | A | A | A | C | A | A | B |
|  | Process adhesiveness | A | A | A | C | B | C | D |
|  | Blocking resistance | B | A | A | A | C | A | A |
|  | Rate characteristics (low-temperature output characteristics) | B | A | A | A | C | D | D |

It can be seen through comparison of Examples 1 to 11 and Comparative Examples 1 to 4 in Tables 1 and 2 that when a particulate polymer is included, when the particulate polymer has a core-shell structure including a core portion and a shell portion covering at least a portion of an outer surface of the core portion, when the core portion is formed of a polymer A, and when the shell portion is formed of a polymer B including not less than 1 mol % and not more than 30 mol % of a sulfo group-containing monomer unit, a composition for a non-aqueous secondary battery functional layer is obtained with which it is possible to form a functional layer that can cause a battery member to display a balance of both high blocking resistance and high process adhesiveness.

It can also be seen through comparison of Example 1 and Example 2 in Tables 1 and 2 that when the shell portion is formed of a polymer B including a sulfo group-containing monomer unit in a smaller amount (5 mol %) than the upper limit (20 mol %) of a preferable range, blocking resistance of a battery member for a non-aqueous secondary battery can be improved, and dusting resistance of a functional layer formed from a composition for a non-aqueous secondary battery functional layer can be improved.

It can also be seen through comparison of Example 1 and Example 3 in Tables 1 and 2 that when the shell portion is formed of a polymer B including a sulfo group-containing monomer unit in a larger amount (5 mol %) than the lower limit (2 mol %) of a preferable range, process adhesiveness of a battery member can be improved, and rate characteristics of a non-aqueous secondary battery that includes a battery member for a non-aqueous secondary battery can be improved.

It can also be seen through comparison of Example 1 and Example 4 in Tables 1 and 2 that dusting resistance of a functional layer can be improved, a balance of high levels of blocking resistance and process adhesiveness of a battery member can be achieved, and rate characteristics of a non-aqueous secondary battery can be improved both when lithium styrene sulfonate (LiSS) is used as the sulfo group-containing monomer unit and when acrylamidomethylpropane sulfonic acid (AMPS) is used as the sulfo group-containing monomer unit.

It can also be seen through comparison of Example 1 and Example 5 in Tables 1 and 2 that when the volume-average particle diameter of the particulate polymer is larger (0.5 μm) than the lower limit (0.2 μm) of a more preferable range, an increase in resistance of a non-aqueous secondary battery due to separator porosity not being ensured can be inhibited, and rate characteristics of a non-aqueous secondary battery can be improved.

It can also be seen through comparison of Example 1 and Example 6 in Tables 1 and 2 that when the volume-average particle diameter of the particulate polymer is smaller (0.5 μm) than the upper limit (0.7 μm) of a particularly preferable range, process adhesiveness of a battery member can be improved.

It can also be seen through comparison of Example 1 and Example 7 in Tables 1 and 2 that when the amount of a binder per 100 parts by mass of the particulate polymer is not less (10 parts by mass) than the lower limit (10 parts by mass) of a particularly preferable range, adhesiveness to a battery member can be improved, process adhesiveness of a battery member can be improved, and dusting resistance of a functional layer formed from a composition for a non-aqueous secondary battery functional layer can be improved.

It can also be seen through comparison of Example 1 and Example 8 in Tables 1 and 2 that when the amount of a binder per 100 parts by mass of the particulate polymer is less (10 parts by mass) than the upper limit (25 parts by mass) of a more preferable range, it is possible to ensure porosity of a battery member and improve rate characteristics of a non-aqueous secondary battery that includes the battery member, and also to inhibit an increase of a low-Tg component and improve reduction of blocking resistance of a battery member that includes a functional layer.

It can also be seen through comparison of Example 1 and Example 9 in Tables 1 and 2 then when the glass-transition temperature of the shell portion is higher (102° C.) than the lower limit (90° C.) of a preferable range, it is possible to improve blocking resistance of a battery member and also to ensure porosity of the battery member and improve rate characteristics of a non-aqueous secondary battery that includes the battery member.

It can also be seen through comparison of Example 1 and Example 10 in Tables 1 and 2 that when the glass-transition temperature of the shell portion is within a particularly preferable range (97° C. to 120° C.), dusting resistance of a functional layer can be improved, a balance of high levels of blocking resistance and process adhesiveness of a battery member can be achieved, and rate characteristics of a non-aqueous secondary battery can be improved.

It can also be seen through comparison of Example 1 and Example 11 in Tables 1 and 2 that dusting resistance of a functional layer can be improved, a balance of high levels of blocking resistance and process adhesiveness of a battery member can be achieved, and rate characteristics of a non-aqueous secondary battery can be improved both when the chemical composition of the core portion is as in Example 1 and when the chemical composition of the core portion is as in Example 11.

It can also be seen through comparison of Example 1 and Comparative Example 1 in Tables 1 and 2 that when the shell portion is formed of a polymer B including a specific amount of a sulfo group-containing monomer unit, dusting resistance of a functional layer can be improved, and process adhesiveness of a battery member can be improved.

It can also be seen through comparison of Example 1 and Comparative Example 2 in Tables 1 and 2 that when the shell portion is formed of a polymer B including not more (5 mol %) than 30 mol % of a sulfo group-containing monomer unit, it is possible to increase the molecular weight of the shell portion and improve process adhesiveness of a battery member, to prevent the shell portion becoming water-soluble, cause the particulate polymer to form a core-shell structure, and improve blocking resistance of a battery member, and to inhibit an increase in resistance of a non-aqueous secondary battery due to separator porosity not being ensured and improve rate characteristics of the non-aqueous secondary battery.

It can also be seen through comparison of Example 1 and Comparative Example 3 in Tables 1 and 2 that when the particulate polymer has a core-shell structure, it is possible to improve blocking resistance of a battery member, to inhibit reduction of deformability of the particulate polymer and improve process adhesiveness of a battery member, and to inhibit reduction of lithium ion conductivity and improve rate characteristics of a non-aqueous secondary battery by inhibiting reduction of the degree of swelling in electrolyte solution of the polymer A forming the core portion.

It can also be seen through comparison of Example 1 and Comparative Example 4 in Tables 1 and 2 that when a particulate polymer that has a core-shell structure and is not cross-linked particles is used, it is possible to improve process adhesiveness of a battery member, to inhibit reduction of lithium ion conductivity and improve rate characteristics of a non-aqueous secondary battery by inhibiting reduction of the degree of swelling in electrolyte solution of the polymer A forming the core portion, and to improve dusting resistance of a functional layer.

INDUSTRIAL APPLICABILITY

According to the present disclosure, it is possible to provide a composition for a non-aqueous secondary battery functional layer with which it is possible to form a functional layer that can cause a battery member for a non-aqueous secondary battery to display a balance of both high blocking resistance and high process adhesiveness.

Moreover, according to the present disclosure, it is possible to provide a battery member for a non-aqueous secondary battery that can display a balance of both high blocking resistance and high process adhesiveness, a method of producing a laminate for a non-aqueous secondary battery including this battery member for a non-aqueous secondary battery, and a non-aqueous secondary battery including this battery member for a non-aqueous secondary battery.

REFERENCE SIGNS LIST

100 Particulate polymer
110 Core portion
110S Outer surface of core portion
120 Shell portion

The invention claimed is:
1. A composition for a non-aqueous secondary battery functional layer, comprising a particulate polymer, wherein
  the particulate polymer has a core-shell structure including a core portion and a shell portion covering at least a portion of an outer surface of the core portion,
  the particulate polymer has a volume-average particle diameter of not less than 0.05 μm and not more than 1.5 μm,
  the core portion is formed of a polymer A including an aromatic vinyl monomer unit, having a degree of swelling in electrolyte solution of 400 mass % or less, and having a glass-transition temperature of 25° C. or higher, and
  the shell portion is formed of a polymer B including not less than 1 mol % and not more than 30 mol % of a sulfo group-containing monomer unit, wherein the sulfo group-containing monomer unit is a lithium styrene sulfonate unit.
2. The composition for a non-aqueous secondary battery functional layer according to claim 1, wherein the shell portion partially covers the outer surface of the core portion.
3. The composition for a non-aqueous secondary battery functional layer according to claim 1, wherein the polymer A includes a (meth)acrylic acid ester monomer unit.
4. The composition for a non-aqueous secondary battery functional layer according to claim 1, further comprising a binder, wherein
  not less than 1 part by mass and not more than 30 parts by mass of the binder is contained per 100 parts by mass of the particulate polymer.
5. A battery member for a non-aqueous secondary battery, comprising a non-aqueous secondary battery functional layer formed using the composition for a non-aqueous secondary battery functional layer according to claim 1.
6. A method of producing a laminate for a non-aqueous secondary battery in which a separator and an electrode are stacked and in which at least one of the separator and the electrode is the battery member for a non-aqueous secondary battery according to claim 5, the method comprising:

a stacking step of stacking the separator and the electrode; and an adhering step of pressing the separator and the electrode that have been stacked to adhere the separator and the electrode.

7. A non-aqueous secondary battery comprising the battery member for a non-aqueous secondary battery according to claim 5.

* * * * *